(12) United States Patent
Murashita

(10) Patent No.: US 9,569,818 B2
(45) Date of Patent: Feb. 14, 2017

(54) ULTRASONIC IMAGE PROCESSING APPARATUS

(75) Inventor: Masaru Murashita, Mitaka (JP)

(73) Assignee: HITACHI, LTD., Tokyo (JP)

( * ) Notice: Subject to any disclaimer, the term of this patent is extended or adjusted under 35 U.S.C. 154(b) by 1341 days.

(21) Appl. No.: 13/286,816

(22) Filed: Nov. 1, 2011

(65) Prior Publication Data

US 2012/0121150 A1   May 17, 2012

(30) Foreign Application Priority Data

Nov. 16, 2010  (JP) ................. 2010-255542

(51) Int. Cl.
*G06K 9/00*   (2006.01)
*G06T 3/40*   (2006.01)

(52) U.S. Cl.
CPC ... *G06T 3/4023* (2013.01); *G06T 2207/10132* (2013.01)

(58) Field of Classification Search
None
See application file for complete search history.

(56) References Cited

U.S. PATENT DOCUMENTS

| | | | | |
|---|---|---|---|---|
| 5,390,674 A * | 2/1995 | Robinson et al. | ............ | 600/443 |
| 6,648,824 B2 * | 11/2003 | Hwang et al. | ................ | 600/437 |
| 8,135,198 B2 * | 3/2012 | Lachaine et al. | ............ | 382/131 |
| 2005/0041842 A1 * | 2/2005 | Frakes et al. | ................ | 382/128 |
| 2007/0083114 A1 | 4/2007 | Yang et al. | | |
| 2009/0087056 A1 * | 4/2009 | Fu et al. | ....................... | 382/131 |
| 2010/0034448 A1 * | 2/2010 | Lee | ............................... | 382/131 |
| 2010/0150412 A1 | 6/2010 | Robinson | | |
| 2010/0185085 A1 * | 7/2010 | Hamilton | ..................... | 600/437 |

(Continued)

FOREIGN PATENT DOCUMENTS

| | | |
|---|---|---|
| JP | 05-154153 A | 6/1993 |
| JP | 09-131342 A | 5/1997 |

(Continued)

OTHER PUBLICATIONS

Mo, et al., "Compact Ultrasound Scanner with Built-in Raw Data Acquisition Capabilities", Ultrasonics Symposium, IEEE, dated Oct. 1, 2007, pp. 2259-2262, XP031195459.

(Continued)

*Primary Examiner* — Vikkram Bali
(74) *Attorney, Agent, or Firm* — Westerman, Hattori, Daniels & Adrian, LLP

(57) ABSTRACT

There is provided an ultrasound image processing apparatus which displays an ultrasonic image with a higher resolution. In a received frame, a first pixel array, a second pixel array, and a third pixel array are defined in depths different from each other. For each pixel of interest on the first pixel array, a pattern matching process is applied between the first pixel array and the second pixel array, to calculate a mapping address on the second pixel array for the pixel of interest. In addition, for each pixel of interest on the third pixel array, a pattern matching process is applied between the third pixel array and the second pixel array, to calculate a mapping address on the second pixel array for each pixel of interest. The second pixel array is re-constructed into a high-density pixel array using pixel values and mapping addresses of a plurality of pixels of interest.

15 Claims, 28 Drawing Sheets

(56) References Cited

U.S. PATENT DOCUMENTS

2012/0121149 A1* 5/2012 Murashita .................... 382/131

FOREIGN PATENT DOCUMENTS

| JP | 09-131346 A | 5/1997 |
| JP | 2003-299651 A | 10/2003 |
| JP | 2005-87266 A | 4/2005 |
| JP | 2007-236606 A | 9/2007 |
| JP | 2008-534106 A | 8/2008 |

OTHER PUBLICATIONS

Zhang, et al., "Super-Resolution Reconstruction of Deformable Tissue from Temporal Sequence of Ultrasound Images", 2010 International Conference on Artificial Intelligence and Computational Intelligence (AICI), IEEE, dated Oct. 23, 2010, pp. 337-342, XP031817205.
European Search Repost dated Mar. 19, 2012, issued in corresponding European Patent Application No. 11008613.9, (7 pages).
Japanese Office Action dated Apr. 15, 2014, issued in corresponding Japanese Patent Application No. 2010-255542 (3 pages).

* cited by examiner

|  | i = 0 | 1 | 2 | 3 | ... | ... | n = 1 |
|---|---|---|---|---|---|---|---|
| j = 0 | 500 | 400 | 350 | 300 | 350 | 500 | 900 |
| 1 | 500 | 300 | 200 | 150 | 250 | 450 | 700 |
| 2 | 400 | 250 | 80 | 100 | 200 | 400 | 600 |
| 3 | 450 | 150 | 120 | 200 | 250 | 450 | 650 |
| ... | 500 | 300 | 200 | 300 | 350 | 500 | 700 |
| ... | 600 | 500 | 400 | 350 | 400 | 500 | 750 |
| m - 1 | 800 | 700 | 600 | 450 | 600 | 700 | 800 |

FIG. 6

ULTRASONIC IMAGE PROCESSING APPARATUS

BACKGROUND

Technical Field

The present invention relates to an ultrasonic image processing apparatus, and in particular to a technique for improving resolution or quality of ultrasonic images.

Background Art

An ultrasonic image processing apparatus is formed, for example, as an ultrasound diagnosis apparatus or an information-processing device. In the information-processing device, image data provided from the ultrasound diagnosis apparatus are processed. In the following, an ultrasound diagnosis apparatus will be described. An ultrasound diagnosis apparatus is an apparatus which transmits and receives ultrasound to and from a living body, and which forms an ultrasonic image based on received information acquired by the transmission and reception of the ultrasound. As an ultrasonic image, a two-dimensional tomographic image, a two-dimensional bloodstream image, a three-dimensional image, or the like are known.

More specifically, an imaginary scan plane is formed by electronic scanning of the ultrasonic beam in a living body. With this process, a received frame (received frame data) corresponding to the beam scan plane is acquired. The received frame comprises a plurality of beam data sets arranged in a beam scan direction, and each beam data set comprises a plurality of echo data sets arranged in a depth direction. In other words, the received frame comprises a two-dimensionally placed group of echo data (echo data array). An individual echo data point is an element of the received frame, and is generally called a "pixel". An element of a display frame to be described later is also generally called a pixel.

Each of the pixels of the received frame has an address conforming with a transmission/reception coordinate system (a polar coordinate system in the case of electronic sector scanning). In order to convert the received frame into a display frame; that is, in order to convert from the transmission/reception coordinate system to a display coordinate system (orthogonal coordinate system), the ultrasound diagnosis apparatus is equipped with a scan converter (JP 2003-299651 A). In addition to the coordinate conversion function, the scan converter has an interpolation processing function, a frame rate adjusting function, or the like.

In order to improve the quality of the ultrasonic image, it is desirable to increase the resolution or density of the received frame. However, if the number of beam data sets of one received frame (echo data density) is increased, the received frame rate would be reduced. An inter-frame interpolation process or an inter-line interpolation process may be applied to the received frame, to increase the pixel density or the line density. However, in the related art, a simple linear interpolation process has been used as such interpolation processes, and, therefore, even though an amount of data appears to be increased, the quality of the ultrasonic image cannot be sufficiently improved.

In beam scanning methods such as sector scanning, convex scanning, radial scanning, etc., a beam array of a fan shape or a radial shape is formed, and the beam spacing is widened for deeper sites. In the scan converter described above, a large number of pixels required for the display frame are generated by interpolation calculation. Therefore, a large number of interpolation pixels are embedded in a deep portion in the display frame. Thus, in such a deep portion, although pixel insufficiency does not occur, there has been a problem in that the image is blurred. More specifically, there has been a problem in that the image shifts or deforms in the beam scan direction. A similar problem occurs when a three-dimensional image is formed.

SUMMARY

An advantage of the present invention is that a density of an ultrasonic image is increased, to improve image quality.

Another advantage of the present invention is that, when a scanning method in which an ultrasonic beam array is formed in a fan shape or a radial shape is executed, image quality is improved in the ultrasonic image, in particular, in a deep portion of the image.

According to one aspect of the present invention, there is provided an ultrasonic image processing apparatus comprising an in-frame processor which applies a process between a first pixel array and a second pixel array in a frame acquired by transmitting and receiving ultrasound, and which calculates a movement destination on the second pixel array for each pixel of interest in the first pixel array, and a re-constructing unit which re-constructs the second pixel array into a high-density pixel array using the movement destination calculated for each pixel of interest.

With the above-described configuration, the density of the second pixel array can be increased using information in the first pixel array. In other words, because of continuity of the tissue on the beam scan plane, a local pixel value pattern observed on a certain pixel array and a local pixel value pattern observed on another pixel array nearby tend to be similar to each other. Therefore, the data of the former pixel array can be used to improve the latter pixel array. In particular, the method is preferably applied between two pixel arrays that are adjacent in space. By incorporating the content of a first pixel array into a second, adjacent pixel array, the resolution of the content of the second pixel array can be improved. With this process, for example, an outline and a boundary can be emphasized. More specifically, first, the in-frame process is used to calculate a movement destination (or corresponding position) on the second pixel array, for a plurality of pixels forming an entirety of or a part of the first pixel array. With this process, an additional group of pixels which are imaginarily or actually mapped can be defined or considered on the second pixel array. With the additional group of pixels, the pixel density of the second pixel array can be increased. The high-density pixel array may be re-constructed by simply adding the additional group of pixels to the original group of pixels of the second pixel array, or the high-density pixel array may be re-constructed by newly calculating a group of interpolation pixels using the original group of pixels and the additional group of pixels, and based on the original group of pixels and the group of interpolation pixels. In the former case, the original group of pixels (that is, the second pixel array) and the additional group of pixels may be handled without distinction, or, alternatively, the original group of pixels and the additional group of pixels may be managed separately in view of the convenience of the data process. For example, in the scan conversion of the frame, in addition to the original group of pixels, pixel values and movement destinations of pixels forming the entirety of or a part of the frame may also be considered.

With the above-described configuration, there can be created a situation as if the real pixel is increased on the pixel array can be created in place of simple increase of apparent number of pixels by the linear interpolation process, or a situation where the number or density of the real pixels referred to in the interpolation process is increased prior to the interpolation process. Therefore, a high-quality image with a high resolution can be formed, and problems such as blurring of the image can be effectively resolved or reduced.

The above-described ultrasonic image processing apparatus is, for example, an ultrasound diagnosis apparatus which executes ultrasound diagnosis in real time on a living body, or an information-processing device which processes data acquired in such an ultrasound diagnosis apparatus. The pixel on each frame is a frame element, and represents an echo intensity, Doppler information, etc. The density increasing process is preferably applied prior to the conversion from a transmission/reception coordinate system to a display coordinate system.

According to another aspect of the present invention, preferably, each of the first pixel array and the second pixel array includes a plurality of pixels arranged in a beam scan direction, a depth of the first pixel array and a depth of the second pixel array differ from each other, and the high-density pixel array includes a larger number of pixels than a number of formations of received beams in the beam scan direction. Preferably, the first pixel array and the second pixel array are adjacent to each other in the depth direction. The received beam is formed by a phase alignment and summation process, and, normally, one or a plurality of received beams are formed for one transmitting beam.

According to another aspect of the present invention, preferably, the in-frame processor calculates the movement destination of the pixel of interest by applying a pattern matching process between the first pixel array and the second pixel array. A thickness of the first pixel array and the second pixel array in the depth direction is preferably one pixel, but the thickness may alternatively correspond to a plurality of pixels. In such a case also, the one-dimensional pattern matching process is preferably applied as the pattern matching process. Alternatively, a two-dimensional pattern matching process may be employed.

According to another aspect of the present invention, preferably, the in-frame processor comprises a correlation value profile generating unit which generates a correlation value profile as a result of the pattern matching process for each pixel of interest in the first pixel array, and a correspondent address calculating unit which calculates a correspondent address on the second pixel array as the movement destination based on the correlation value profile for each pixel of interest in the first pixel array. With the use of the correlation value profile, it becomes possible to estimate the true best value based on the shape or the like of the profile, and a position corresponding to the true best value can be determined as the correspondent address. According to another aspect of the present invention, preferably, the correspondent address is a correspondent address with a fractional value, including an integer part corresponding to an integer multiple of an original pixel spacing in the second pixel array and a fractional value smaller than the original pixel spacing. In order to calculate the fractional value, for example, a sub-pixel process is employed.

According to another aspect of the present invention, preferably, the re-constructing unit re-constructs the high-density pixel array by an interpolation process based on an original group of pixels of the second pixel array and an additional group of pixels defined by a pixel value and the correspondent address with fractional value for each pixel of interest. The original group of pixels includes real pixels, and the additional group of pixels includes real pixels which exist on another line. The latter pixels are individually mapped on optimum positions on a line of interest so that the resolution or the pixel density can be improved.

According to another aspect of the present invention, preferably, a high-density frame is formed by re-constructing a plurality of pixel arrays of the frame into a plurality of high-density pixel arrays, and the high-density frame includes a plurality of sets of original beam data and a plurality of sets of interpolation beam data. With this configuration, the pitch in the pixel array can be unified and the load in the subsequent calculation can be reduced. The interpolation process on the second pixel array and the scan conversion can be applied at the same time. In other words, based on the group of pixels of the second pixel array and the pixel values and the correspondent addresses of the plurality of pixels of the first pixel array, the display frame can be constructed with one calculation. In this case, however, the calculation during the scan conversion becomes complex, and, therefore, it is preferable to apply the scan conversion process after generating the high-density frame.

According to another aspect of the present invention, preferably, the pixel of interest is selected in a partial region in the first pixel array, and the high-density pixel array is a pixel array in a part of which the density is increased. With this configuration, the density increasing process can be applied on a portion where the resolution is low or a portion for which observation at a high resolution is desired, to thereby shorten the calculation time or reduce the calculation load.

According to another aspect of the present invention, preferably, the in-frame processor calculates, by a process between the second pixel array and a third pixel array in the frame acquired by transmitting and receiving ultrasound, a movement destination on the second pixel array for each pixel of interest in the third pixel array, and the re-constructing unit re-constructs the second pixel array into the high-density pixel array using the movement destination calculated for each pixel of interest in the first pixel array and the movement destination calculated for each pixel of interest in the third pixel array. With this configuration, the real pixel can be imaginarily or actually mapped from previous and subsequent pixel arrays (first pixel array and third pixel array) to an intermediate pixel array (second pixel array), to thereby improve the intermediate pixel array.

According to another aspect of the present invention, preferably, the frame is a frame which conforms with a transmission/reception coordinate system, a high-density frame is formed by repeatedly applying the re-construction of the high-density pixel array, and there is provided a conversion unit which generates a display frame which conforms with a display coordinate system from the high-density frame. According to another aspect of the present invention, preferably, the frame comprises an ultrasonic beam array which is spread radially, and the high-density frame includes a plurality of interpolation lines which are added at least in a deep portion of the frame.

According to another aspect of the present invention, preferably, the frame is a frame which is acquired in real time or a frame which is read from a cine memory. The cine memory is normally a large-capacity memory which stores a large number of frames in time sequential order, and preferably has a ring-buffer structure. By applying the density increasing process on real time data, the image quality of the ultrasonic image which is displayed in real time can be improved. By applying the density increasing process on the data which are read from the cine memory, the image quality of replayed image can be improved.

According to another aspect of the present invention, preferably, the ultrasonic image processing apparatus further comprises a unit which applies a pre-process to increase density of the frame by an inter-frame interpolation process before the frame is input to the in-frame processor According to another aspect of the present invention, preferably, the ultrasonic image processing apparatus further comprises a unit which applies a post-process to further increase the density of a high-density frame generated by repeatedly applying the re-construction of the high-density pixel array or to further increase the density of a display frame acquired based on the high-density frame.

According to another aspect of the present invention, there is provided an ultrasonic image processing apparatus comprising an in-frame processor which applies a process between a first pixel array and a second pixel array in a frame which is acquired by transmitting and receiving ultrasound and which conforms with a transmission/reception coordinate system, and which calculates a movement destination on the second pixel array for each pixel of interest in the first pixel array, and a conversion unit which applies a process to convert the frame which conforms with the transmission/reception coordinate system into a display frame which conforms with a display coordinate system, and which refers to a pixel value for each pixel of interest and the movement destination for each pixel of interest during the conversion process.

According to another aspect of the present invention, there is provided an ultrasonic image processing program comprising a module which applies a process between a first pixel array and a second pixel array in a frame acquired by transmitting and receiving ultrasound, and which calculates a movement destination on the second pixel array for each pixel of interest in the first pixel array, and a module which re-constructs the second pixel array into a high-density pixel array using the movement destination calculated for each pixel of interest. The modules correspond to function units forming the program. The above-described program is stored in a recording medium such as a memory, a CD-ROM, or the like.

BRIEF DESCRIPTION OF THE DRAWINGS

FIG. 6 is a diagram showing an example of a correlation value profile.

DESCRIPTION OF EMBODIMENTS

Preferred embodiments of the present invention will now be described with reference to the drawings.

(1) Density Increasing Using Inter-Frame Pattern Matching Process

Figure 1:
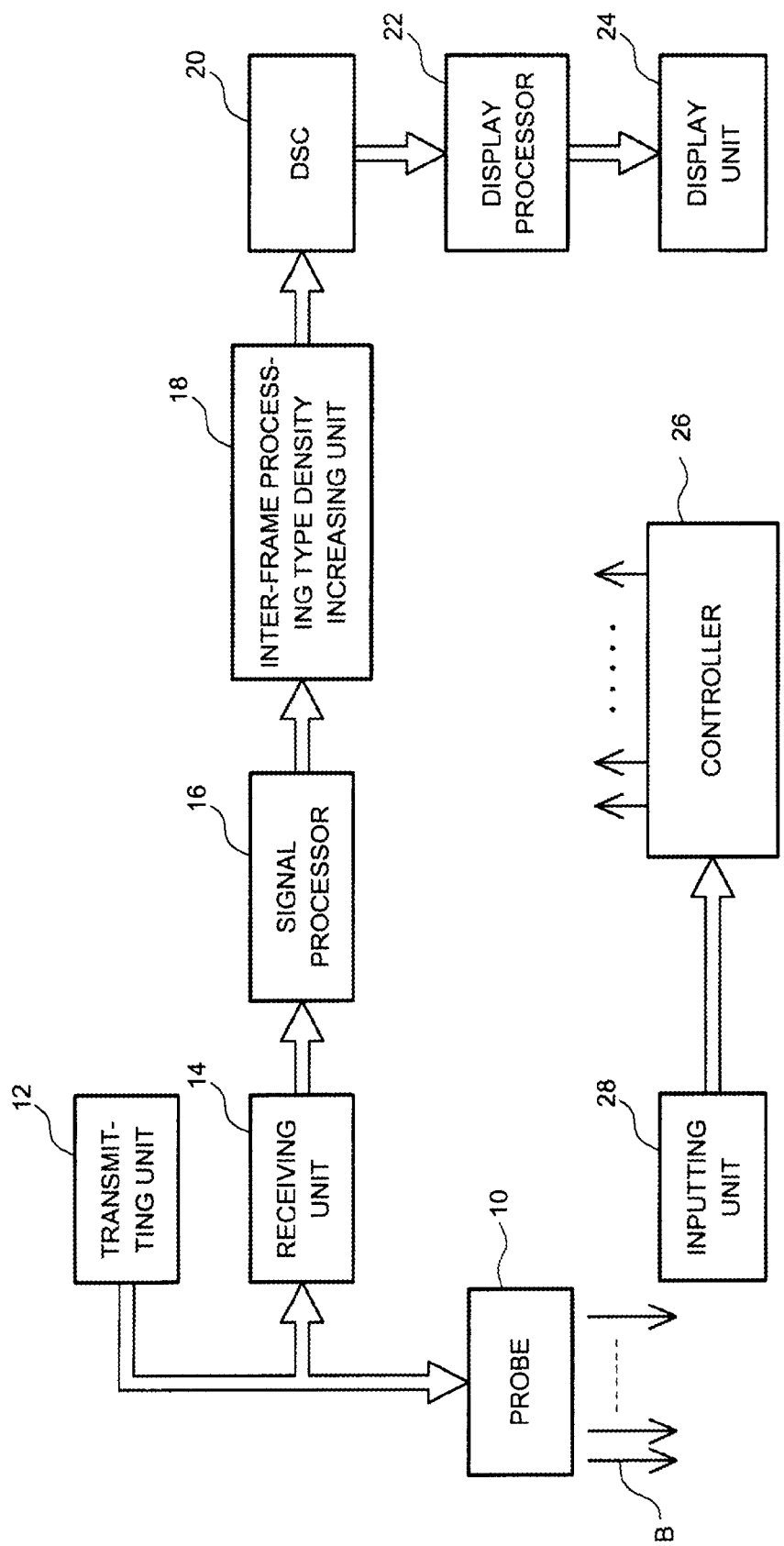
FIG. 1 is a block diagram showing a basic structure of an ultrasonic image processing apparatus (ultrasound diagnosis apparatus) having a density increasing function.

FIG. 1 is a block diagram showing an ultrasound diagnosis apparatus serving as an ultrasonic image processing apparatus. The ultrasound diagnosis apparatus is used in the medical field, and is an apparatus which forms an ultrasonic image based on a received signal which is acquired by transmitting and receiving ultrasound to and from a living body. As the ultrasonic image, a two-dimensional tomographic image, a two-dimensional bloodstream image, a three-dimensional image, etc. are known.

In an example configuration of FIG. 1, a probe 10 comprises a one-dimensional (1D) array transducer. The 1D array transducer comprises a plurality of transducer elements arranged in a straight line shape or an arc shape. An ultrasound beam B is formed by the 1D array transducer, and the ultrasound beam B is electrically scanned. In the present embodiment, the probe 10 is a convex type probe, and the ultrasound beam is convex-scanned. Alternatively, a sector scanning method may be employed, or other electronic scanning methods such as radial scanning and linear scanning may be employed. The "density increasing process" to be described later is preferable in particular when a plurality of ultrasound beams are formed radially. The probe 10 is used while in contact on a body surface in the example configuration of FIG. 1. Alternatively, the probe 10 may be a body cavity insertion type probe.

A transmitting unit 12 is a transmitting beam former. That is, the transmitting unit 12 supplies a plurality of transmitting signals to the probe 10 in parallel to each other during transmission. With this process, a transmitting beam is formed by the 1D array transducer; that is, the ultrasound is radiated into the living body. During reception, a reflected wave from the inside of the living body is received by the 1D array transducer. A plurality of received signals are output from the 1D array transducer to a receiving unit 14 in parallel to each other. The receiving unit 14 is a received beam former, and applies a phase alignment and summation process on the plurality of received signals, to generate beam data corresponding to the received beam. The received signal serving as the beam data are output to a signal processor 16. The signal processor 16 comprises modules such as a wave detection unit, a logarithmic conversion unit, etc. The wave detection unit is a module which converts an RF received signal into a received signal in a baseband range.

As will be described later, a density increasing unit 18 of an inter-frame processing type is a unit which applies a pattern matching process between frames that are adjacent to each other in time, to increase the density or resolution of each frame. In the present embodiment, the density increasing process is applied to a frame (frame data) after the wave detection. Alternatively, the density increasing process may be applied to the RF signal. One frame (frame data) comprises a plurality of beam data sets, and each beam data set comprises a plurality of data sets (frame elements). In the present specification, an individual frame element is referred to as a "pixel". Each pixel is data representing an echo brightness. Alternatively, each pixel may represent Doppler information. A high-density frame which is formed by the density increasing unit 18 is output to a digital scan converter (DSC) 20.

The DSC 20 has a coordinate conversion function, a pixel interpolation function, a frame rate adjusting function, etc. With the DSC 20, the received frame conforming with the transmission/reception coordinate system is converted into a display frame conforming with a display coordinate system. In the present embodiment, the display frame is formed based on the high-density received frame. Therefore, the quality of the ultrasonic image displayed on a screen can be significantly improved. A display processor 22 has a function to combine graphic data or the like on image data formed by the DSC 20, and the display data formed by the display processor 22 are output to a display unit 24. A controller 26 comprises a CPU and an operation program, and controls operations of the elements shown in FIG. 1. An inputting unit 28 is formed with an operation panel in the example configuration shown in FIG. 1. The function of the density increasing unit 18 shown in FIG. 1 may alternatively be realized with software. Although not shown in FIG. 1, a cine memory is provided between the signal processor 16 and the density increasing unit 18. The cine memory is a memory which temporarily stores a plurality of frames in time sequential order, and has a ring buffer structure. The density increasing unit 18 applies a process on a frame acquired in real time, and similarly processes a frame which is read from the cine memory. Alternatively, the cine memory may be provided between the density increasing unit 18 and the DSC 20 or downstream of the DSC 20. In an ultrasonic image processing apparatus which processes data which are output from an ultrasound diagnosis apparatus, a program corresponding to the density increasing unit 18 shown in FIG. 1 is executed.

Figure 2:
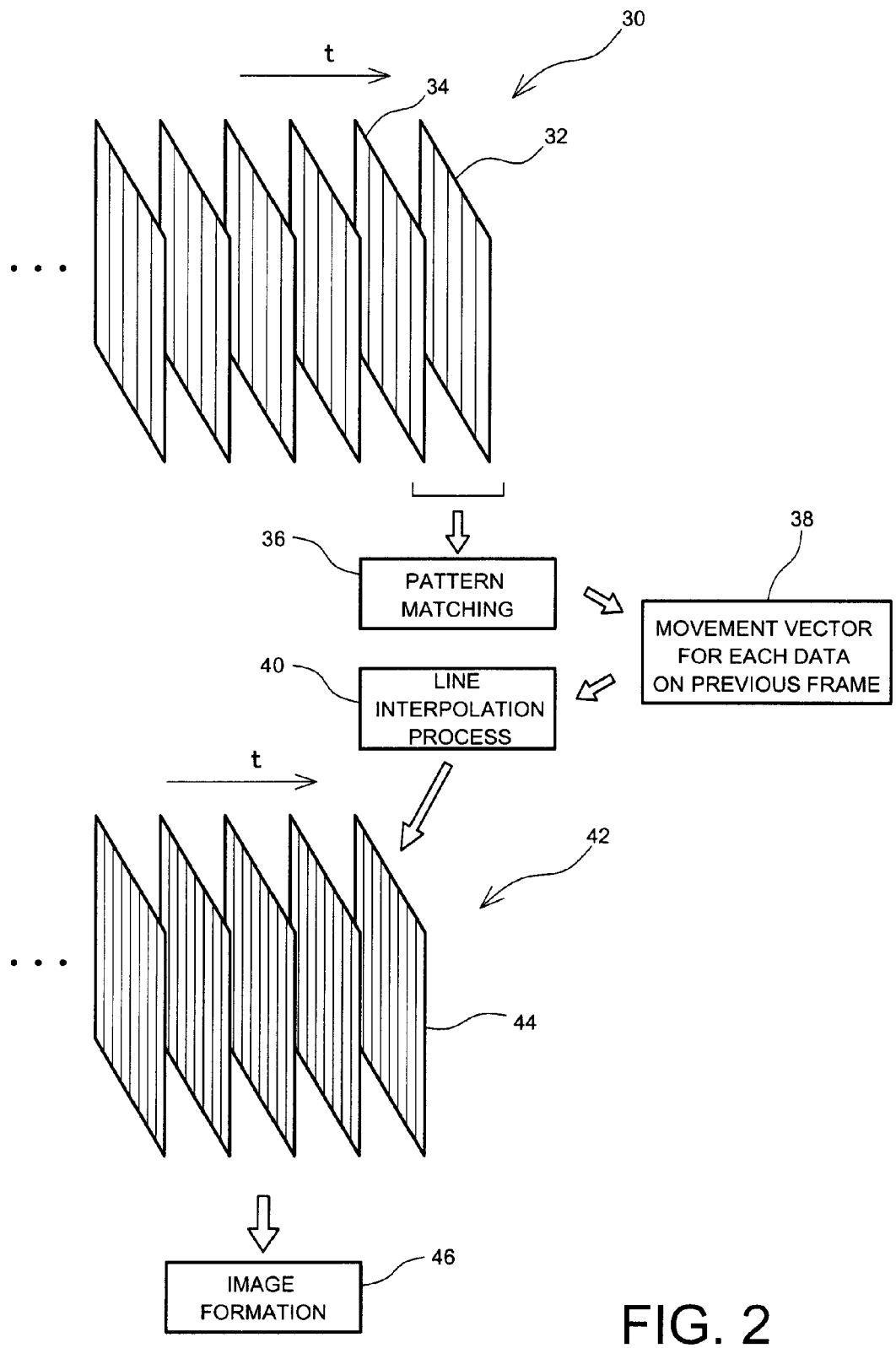
FIG. 2 is a conceptual diagram for explaining an operation of a density increasing unit of an inter-frame processing type shown in FIG. 1.

FIG. 2 shows a conceptual diagram for an operation of the density increasing unit 18 shown in FIG. 1. In FIG. 2, a frame array 30 shown at the upper part is a frame array before the density increasing process, and comprises a plurality of frames arranged in time sequential order. In the example configuration of FIG. 2, each frame is a two-dimensional data array acquired at a given scan plane position in the living body. Alternatively, the frame array may be acquired while moving the scan plane. The density increasing unit applies a pattern matching process (refer to reference numeral 36) between frames. Specifically, between a previous frame 34 and a current frame 32, a pattern matching process is applied for each pixel of interest on the previous frame 34 (a pixel that becomes a copy source). With this process, a two-dimensional movement vector is determined for each data point on the previous frame 34 (refer to reference numeral 38). The two-dimensional movement vector shows a movement destination of the pixel of interest; that is, a correspondent address or a mapping address on the current frame 32.

For each pixel on the previous frame 34, an imaginary mapping or an actual mapping to the current frame 32 is executed, and the current frame 32 is re-constructed based on the result of the mapping, so that the current frame 32 becomes a high-density frame. More specifically, as will be described later, a line interpolation process is applied based on the group of pixels of the current frame 32 and the group of pixels after mapping, so that the high-density frame is formed (refer to reference numeral 40). A group of high-density frames 42 is shown at a lower part of FIG. 2. The group of high-density frames 42 includes a plurality of high-density frames 44. Each high-density frame 44 is formed with a plurality of beam lines which are originally present and a plurality of interpolation lines which are added. That is, the resolution or the density is increased. The DSC described above applies conversion to the display frame on each high-density frame 44 (refer to reference numeral 46). In the example configuration shown in FIG. 1, the density increasing process is applied before the coordinate conversion.

In the linear interpolation process of the related art, an interpolation line is generated simply between two beam lines, and, when such a process is applied, there has been a problem such as the image being blurred or the image being shifted in the electrical scan direction. With the above-described process, the real pixel on the previous frame is used in an augmented manner as a part of the pixels of the current frame, so that the current frame can be made a high-quality frame. In particular, when a plurality of beam lines are set radially, the beam spacing is increased in a deep region, and there has been a problem of reduction of the image quality at the deep region, but with the above-described process, a large number of real pixels can be directly or indirectly embedded between lines, and, therefore, the image quality corresponding to a deep portion in the body can be significantly improved. Here, the real pixel means an original pixel (before coordinate conversion) acquired by the transmission and reception of the ultrasound, as opposed to an imaginary pixel which is generated in calculation during the coordinate conversion.

The density increasing process will now be described in more detail with reference to FIG. 3 and subsequent drawings.

Figure 3:
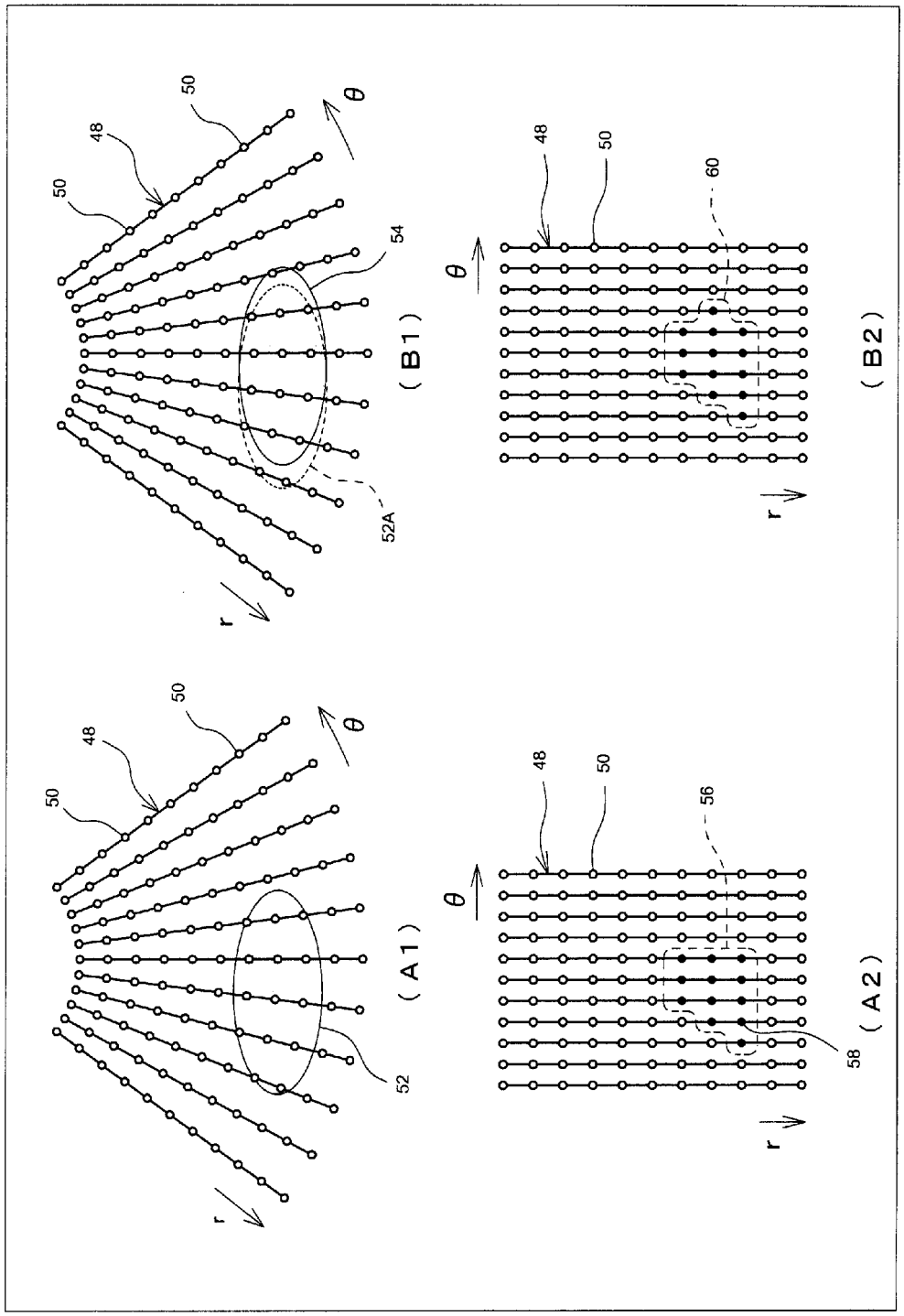
FIG. 3 is a conceptual diagram illustrating a movement of a tissue between frames.

FIG. 3 shows a movement of a tissue between frames. In (A1), a beam data array conceptualized in the real space is shown. The beam data array comprises a plurality of sets of beam data 48, with each set of beam data 48 having a plurality of data points (that is, pixels). Parameter r represents a depth direction and parameter θ represents a beam scan direction. Reference numeral 52 represents a specific tissue present in the body. In (A2), a beam data array conceptualized in a signal processing space is shown. A plurality of sets of beam data 48 are arranged in the θ direction. White circles 50 and black circles 58 respectively represent pixels, and, in particular, the black circles 58 represent pixels within the tissue. In other words, a group of the black circles 58 shown by reference numeral 56 in the signal processing space correspond to the tissue 52 in the real space.

In (B1), a beam data array which is acquired one time phase later is shown. Reference numeral 54 represents the tissue in this time phase, and reference numeral 52A represents the tissue in the previous time phase (refer also to reference numeral 52 in (A)). In (B2), black circles represent pixels within the tissue, and a group of the black circles is specified with reference numeral 60. As is clear from comparison of the group 56 and the group 60, the movement of the tissue between the frames is very small, and, thus, mapping of the past pixel on the current frame is allowed. With such a mapping process, the resolution of the current frame can be significantly improved. Alternatively, a pixel of interest may be set in the current frame, and the pixel of interest may be mapped onto the past frame.

Figure 4:
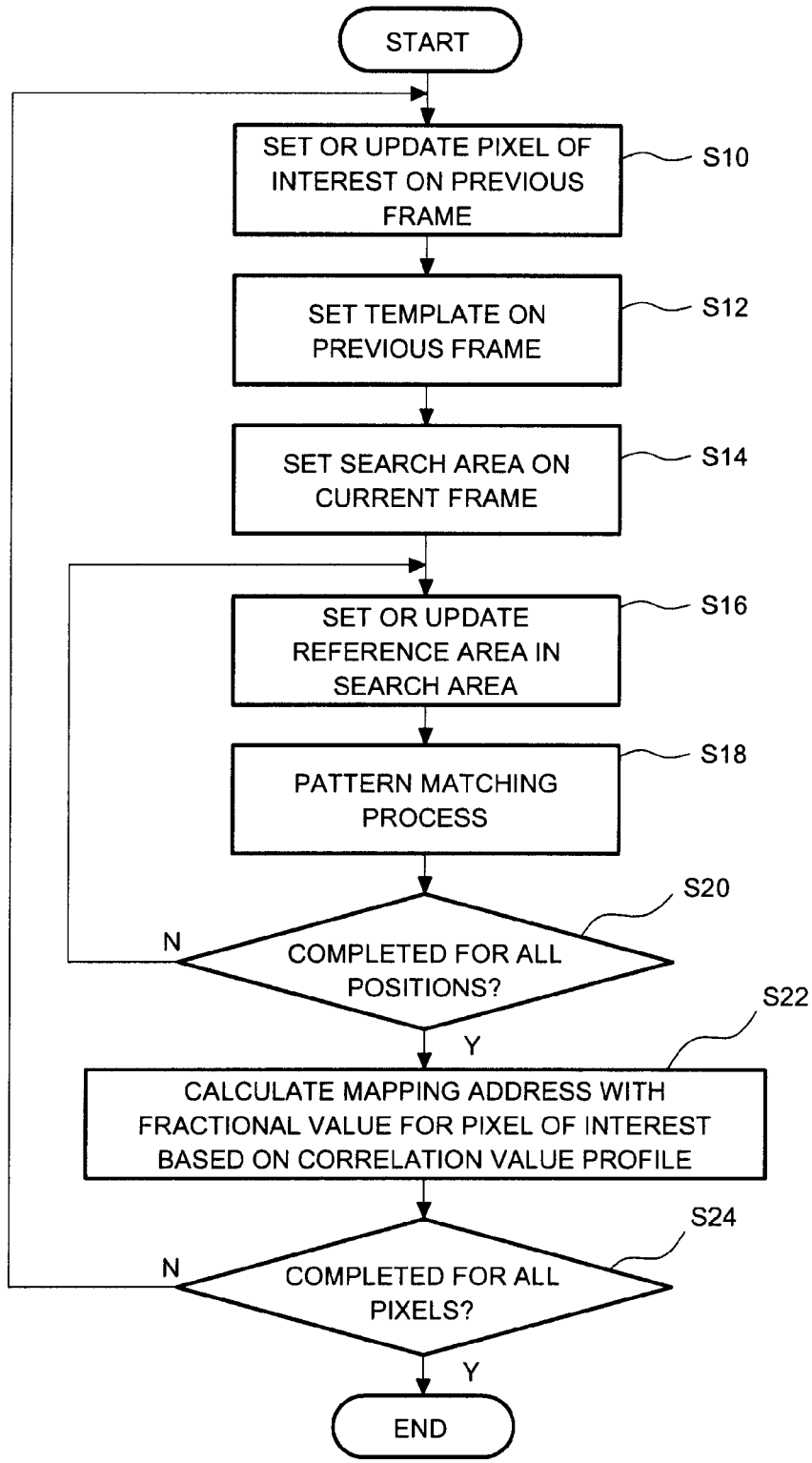
FIG. 4 is a flowchart showing a sequence of steps of a pattern matching process between frames.
Figure 5:
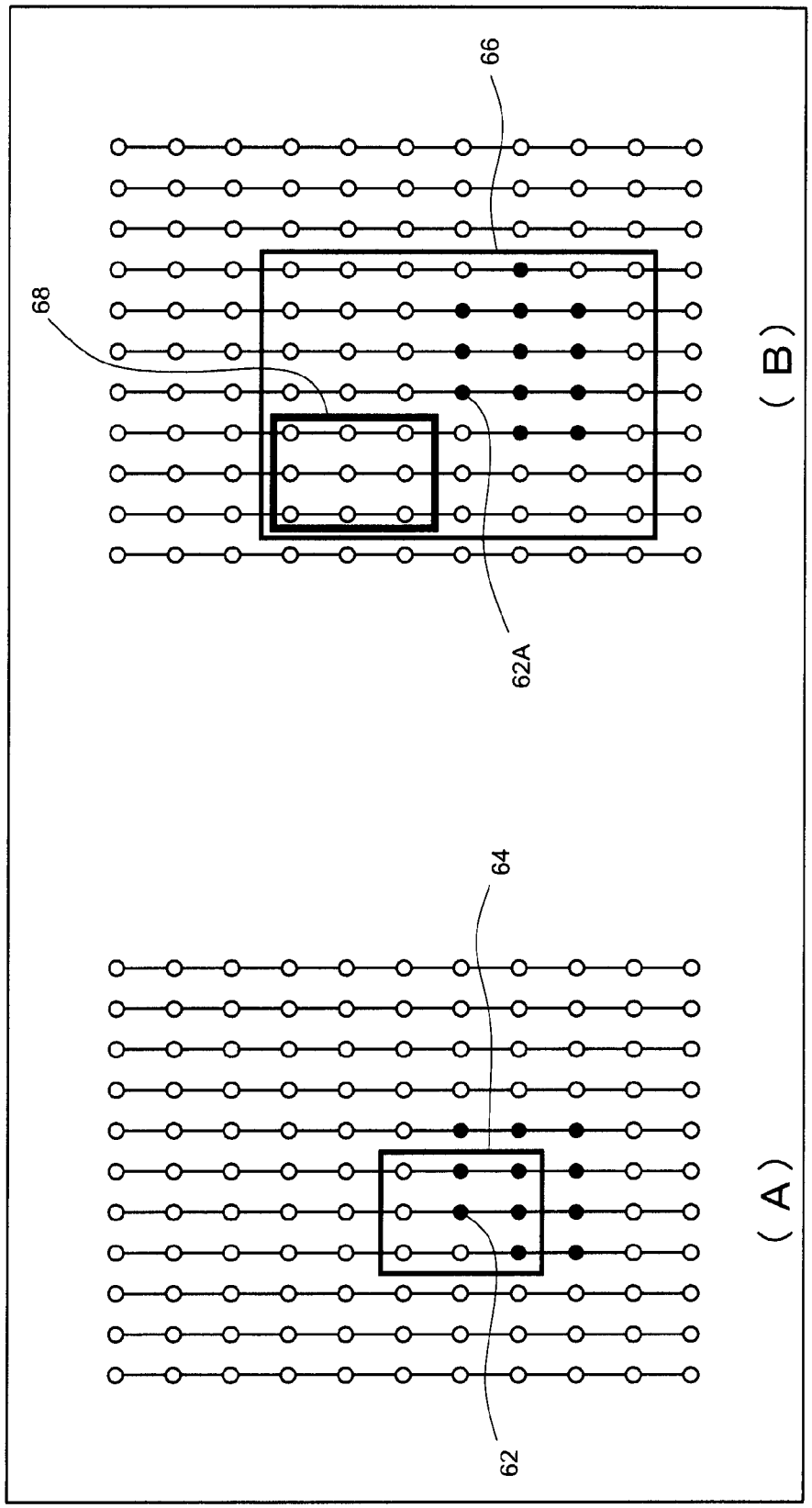
FIG. 5 is a conceptual diagram illustrating a pattern matching process between frames.

FIG. 4 is a flowchart showing a pattern matching process applied in the density increasing unit shown in FIG. 1. First, in S10, a pixel of interest is set on a previous frame, and, in S12, a template is set on the previous frame. Specifically, FIG. 5 shows in (A) a previous frame, individual pixels in the previous frame are set as a pixel of interest 62 in order, and a template 64 is set for each pixel of interest 62 as a predetermined region centered at the pixel of interest 62. In S14 of FIG. 4, a search area is set on the current frame, and in S16, a reference area is set in the search area. Specifically, FIG. 5 shows in (B) the current frame, where reference numeral 62A represents a correspondent point corresponding to the pixel of interest 62. A search area 66 is set with a predetermined size and centered at the correspondent point 62. A reference area 68 is set in the search area 66. The reference area 68 has the same shape and the same size as the template 64. While a position of the reference area 68 is sequentially shifted, a pattern matching process to be described below is applied at each position.

Specifically, in S18 of FIG. 4, the pattern matching process is applied between the template which is set on the previous frame and the reference area which is set on the current frame. The pattern matching process is more specifically a correlation process. For example, a correlation value is calculated using the following equation (1) or equation (2). Here, equation (1) calculates a sum of squared differences (SSD) as the correlation value and equation (2) calculates a sum of absolute differences (SAD) as the correlation value.

$$R_{SSD} = \sum_{j=0}^{N-1} \sum_{i=0}^{M-1} (I(i,j) - T(i,j))^2 \quad (1)$$

$$R_{SAD} = \sum_{j=0}^{N-1} \sum_{i=0}^{M-1} |I(i,j) - T(i,j)| \quad (2)$$

In the equations described above, M and N represent sizes of the templates. That is, M and N represent numbers of pixels in the templates. T(i, j) represents a pixel value of each pixel in the template. I(i, j) represents a pixel value of a pixel in the reference area.

The above-described pattern matching process is repeatedly applied while setting the reference area on each area position in the search area, and, when it is judged in S20 of FIG. 4 that the reference area has been set for all area positions, S22 is executed. In S22, a mapping address with a fractional value (movement destination) is calculated for the pixel of interest based on a two-dimensional correlation value profile representing the correlation values acquired for the area positions by the pattern matching process. In the present embodiment, a sub-pixel process to be described later is applied in S22, and, with this process, a fractional value (fractional value address) which is smaller than the unit address; that is, the unit pixel, is identified.

This process will now be described with reference to FIG. 6. FIG. 6 shows the two-dimensional correlation value profile. A number in each cell represents the correlation value. Among a plurality of correlation values, the numerical value shown by Q1 (80) is the smallest value, and is an apparent smallest correlation value (that is, apparent best correlation value). However, as can be deduced from the correlation value profile of FIG. 6, the actual smallest correlation value Q2 is not necessarily at the position shown by Q1, and, in many cases, is deviated from this position. In consideration of this, in the present embodiment, in order to improve the mapping precision, and, consequently, the image quality, the sub-pixel process is applied to the two-dimensional correlation value profile. Specifically, a combination of an integer address and a fractional value address is specified as the mapping address. Here, a basic unit of the integer address corresponds to the pixel or a pitch between pixels. The fractional value address is a finer address of less than the unit pixel. The sub-pixel process will be described later with reference to FIGS. 7 and 8.

In FIG. 4, in S24, it is judged whether or not the above-described process has been applied for all pixels of the current frame, and, when it is judged that the process is not completed for all pixels, the processes from S10 are repeatedly applied. In other words, the next pixel is set as the pixel of interest (the pixel of interest is updated), and the matching process or the like described above is applied for the new pixel of interest. In the example process of FIG. 4, all pixels of the current frame are set as the pixel of interest. Alternatively, only the pixels of a partial region in the previous frame may be set as the pixel of interest. For example, only the pixels existing in a deep region may be set as the pixel of interest, and a line interpolation process may be applied only to such a deep region.

Figure 7:
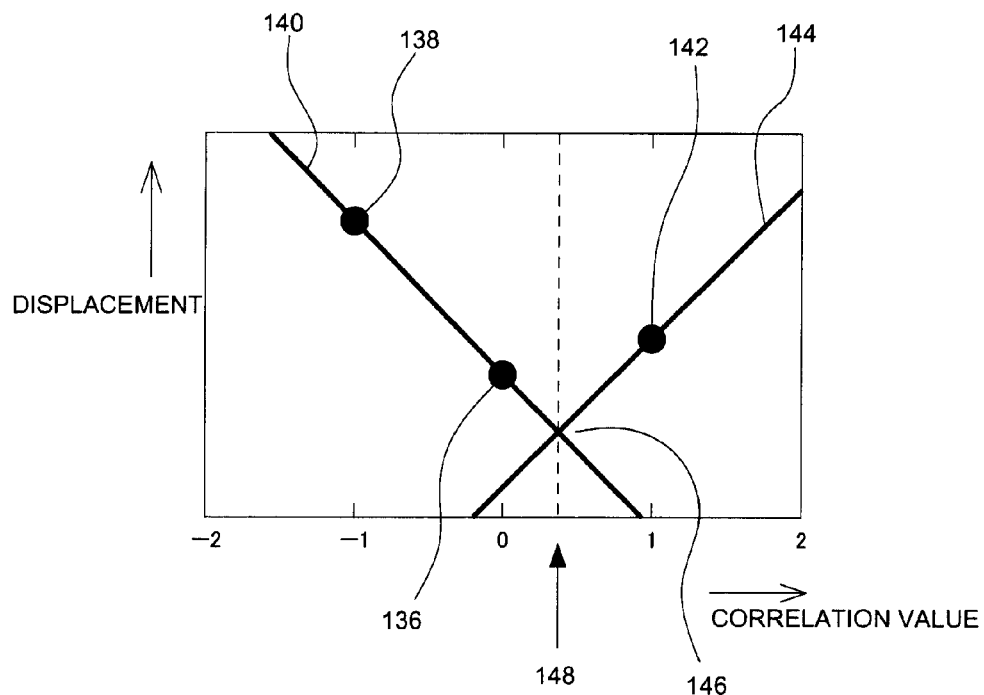
FIG. 7 is a diagram showing a first example of a sub-pixel process.
Figure 8:
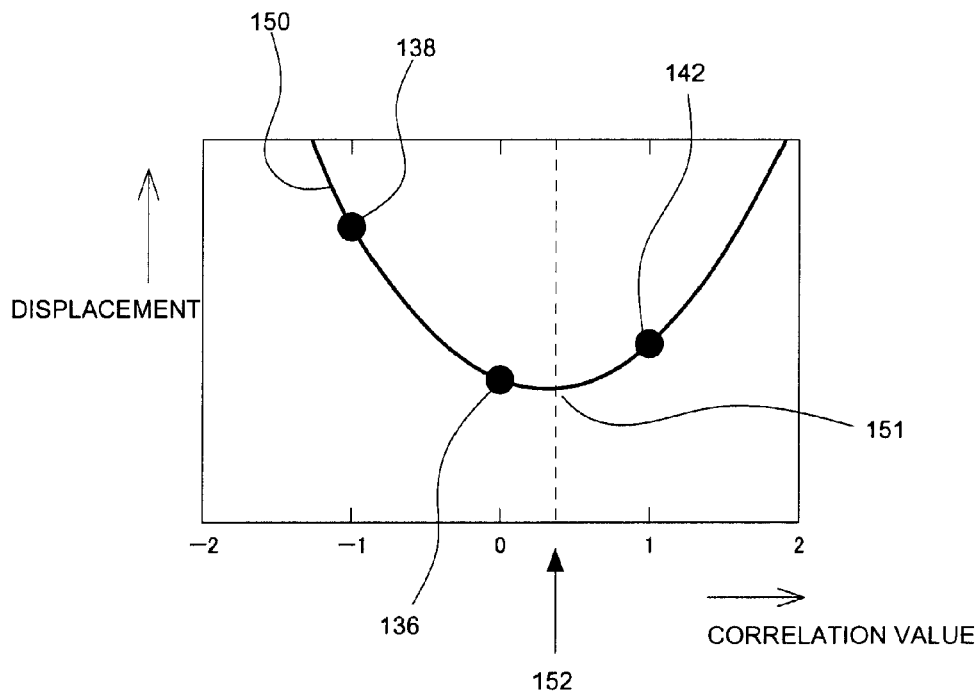
FIG. 8 is a diagram showing a second example of a sub-pixel process.

FIG. 7 shows a first example of the sub-pixel process, and FIG. 8 shows a second example of the sub-pixel process. FIGS. 7 and 8 show one-dimensional sub-pixel processes, but in reality, a two-dimensional sub-pixel process is applied.

The sub-pixel process shown in FIG. 7 is based on an isogonal line fitting method. Reference numeral 136 shows a smallest value (best value), reference numeral 142 shows a second smallest value, and reference numeral 138 represents a third smallest value. A horizontal axis represents displacement, with a unit of one pixel. A vertical axis represents the correlation value. In the isogonal line fitting method, first, a straight line 140 passing through the smallest value 136 and the third smaller value 138 is defined. Next, a straight line 144 which is an inverted straight line in which the slope of the straight line 140 is inverted and which passes through the second smallest value 142 is defined. Then, an intersection 146 of the two straight lines 140 and 144 is identified. A sub-pixel estimate value 148 is determined as a position where the intersection 146 exists. The sub-pixel estimate value 148 has, in addition to the normal integer address, a fractional value address.

In a parabola fitting method shown in FIG. 8, first, a second-order function (parabola curve) passing through the smallest value 136, the second smallest value 142, and the third smallest value 138 is defined. Then, in the second-order function, a position 151 of an axis of symmetry is identified. The position 151 is set as a sub-pixel estimate value 152. These sub-pixel estimation values may alternatively be determined through other methods.

Next, a line interpolation process which is applied following the pattern matching process will be described with reference to FIGS. 9-12.

Figure 9:
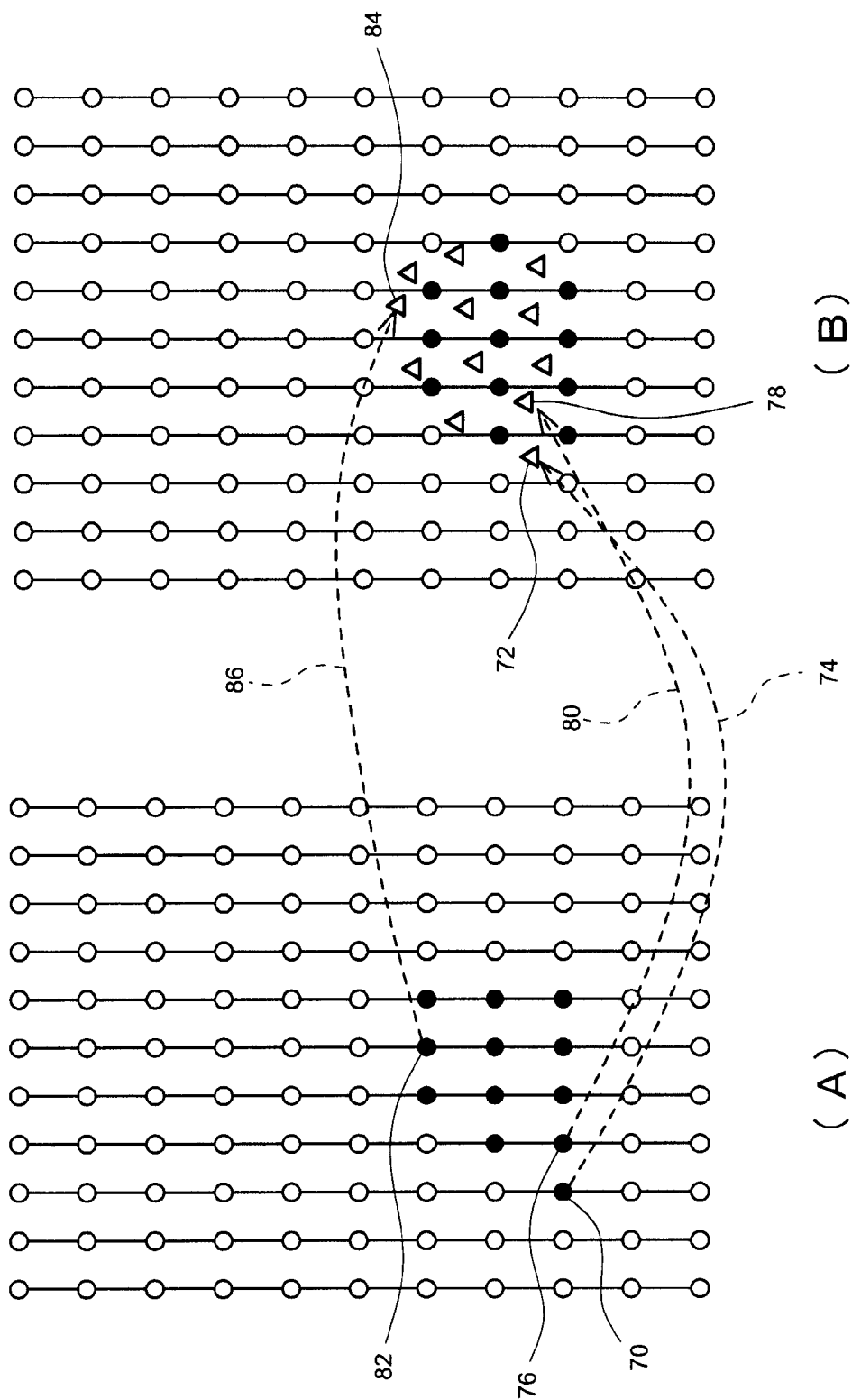
FIG. 9 is a conceptual diagram showing a two-dimensional mapping address (movement destination).

FIG. 9 shows a correspondence relationship of pixels. The previous frame is shown in (A), and the current frame is shown in (B). By the calculation of the mapping address with fractional value for each pixel described above, a mapping position (copy destination position) is determined for each pixel of the previous frame. In FIG. 9, black circles represent pixels within the tissue, and white circles represent other pixels. These pixels are both pixels on the beam line. A triangle represents a position of the pixel (correspondent position) after the mapping. More specifically, a pixel 70 on the previous frame corresponds to a position 72 on the current frame, and this relationship is shown by reference numeral 74. Similarly, a pixel 76 in the previous frame corresponds to a position 78 in the current frame, and the correspondence relationship is shown by reference numeral 80. A pixel 82 in the previous frame corresponds to a position 84 in the current frame, and the correspondence relationship is shown by reference numeral 86. The pixel on the previous frame may be actually mapped onto the current frame, or, alternatively, the correspondence relationship may be managed and referred to as data. In either case, by increasing the number of pixels of the current frame, the precision of the line interpolation calculation can be improved.

Figure 10:
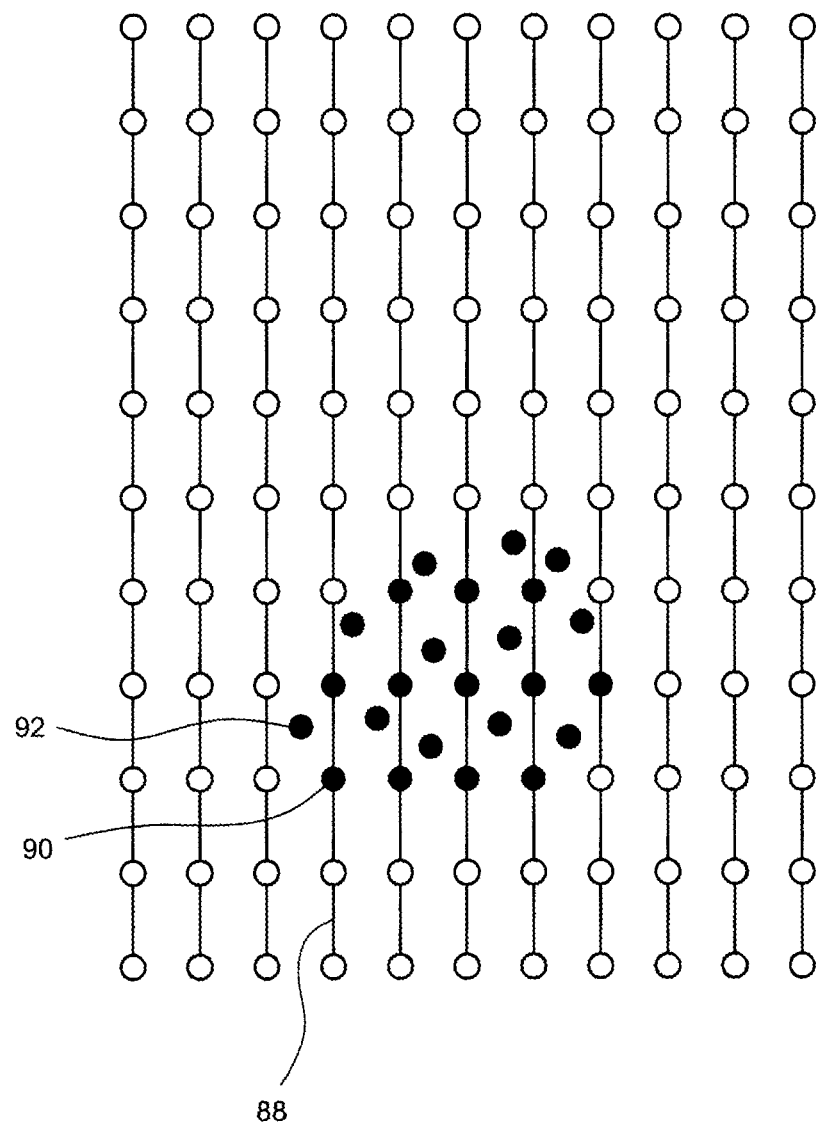
FIG. 10 is a conceptual diagram illustrating an imaginary mapping process result between frames.
Figure 11:
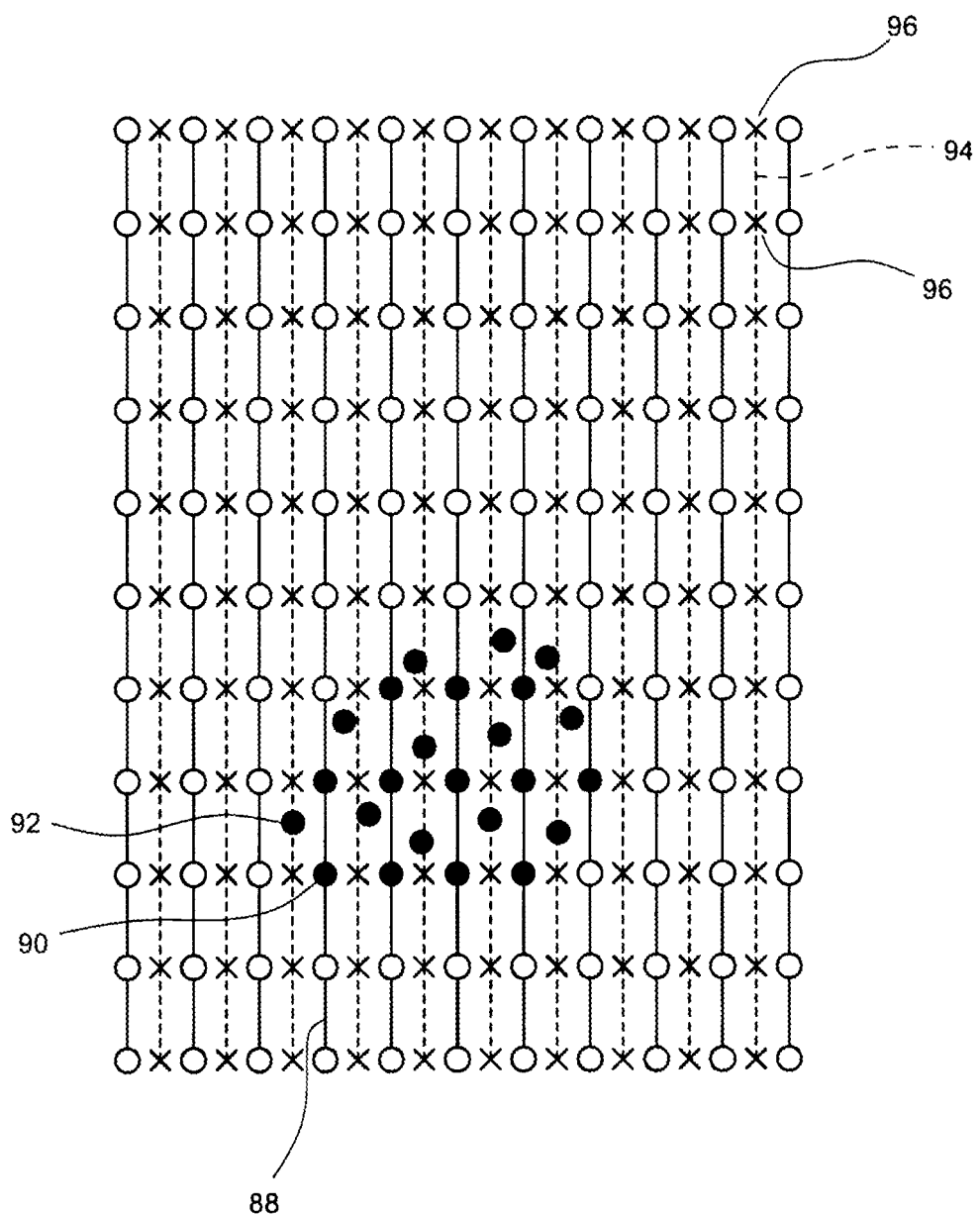
FIG. 11 is a conceptual diagram illustrating an interpolation pixel address generated by a line interpolation process.
Figure 12:
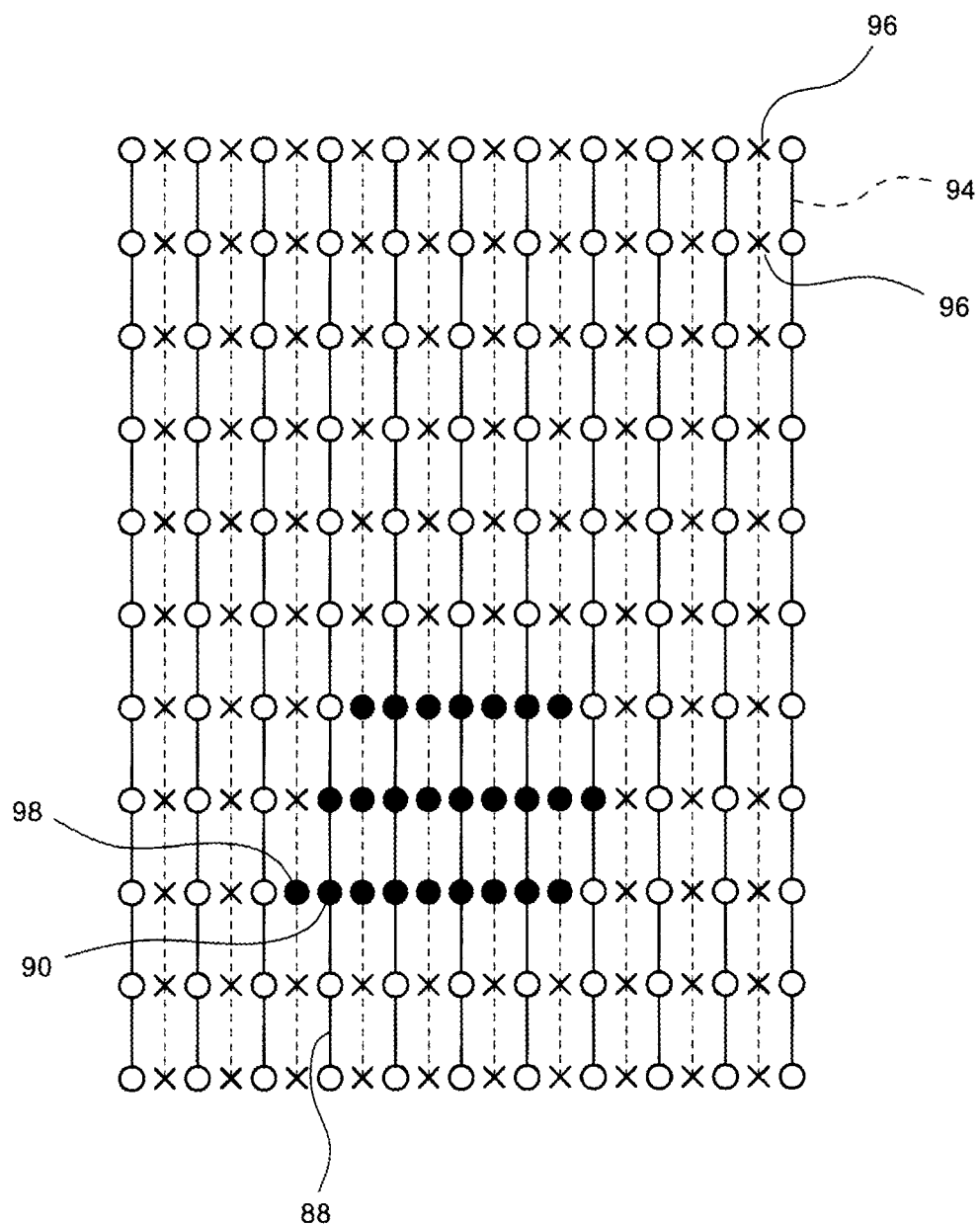
FIG. 12 is a conceptual diagram illustrating a frame with the increased density after the interpolation process.

FIG. 10 shows a result of imaginary mapping. Reference numeral 90 represents a real pixel on a beam line 88, and reference numeral 92 represents a pixel added by mapping. These pixels are used for the line interpolation process. More specifically, FIG. 11 shows a plurality of interpolation lines 94 which are additionally set for the plurality of sets of beamdata (beam lines). Each interpolation line has a plurality of interpolation points or interpolation pixels 96. By applying the line interpolation process based on the plurality of real pixels 90 and the plurality of additional pixels (real pixels on the previous frame) 92, a frame after line interpolation (high-density frame) as shown in FIG. 12 can be acquired. The real pixels 90 exist on the beam line 88. A plurality of interpolation pixels 98 exist on each interpolation line 94. If all of the real pixels and the interpolation pixels are aligned in this manner; that is, if the high-density frame has an orderly two-dimensional arrangement, the next scan conversion process can be applied quickly and easily. Alternatively, the scan conversion process may be applied using the plurality of real pixels after mapping shown in FIG. 10. Alternatively, it is also possible to not actually execute copying of the pixels of the previous frame, to refer to the plurality of pixel values and the plurality of mapping addresses of the pixels of the previous frame, and to apply the scan conversion process on the current frame.

Figure 13:
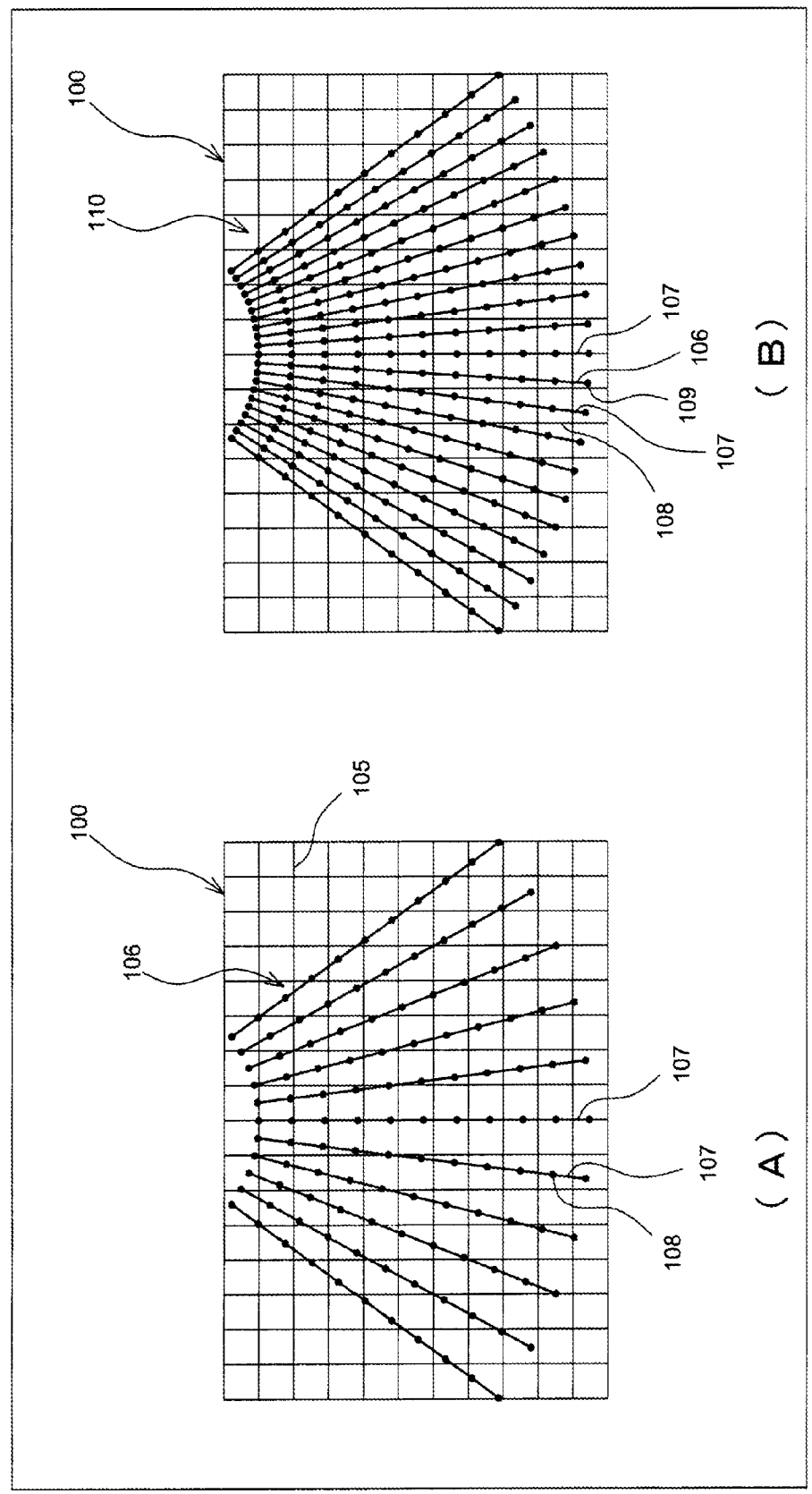
FIG. 13 is a conceptual diagram illustrating a beam interpolation process for a beam data array which spreads radially.

FIG. 13 shows an effect of the line interpolation process described above. In (A), a state before the line interpolation process is shown, and, in (B), a state after the line interpolation process is shown. Reference numeral 100 represents a display matrix, and each intersection 105 existing in the display matrix represents a position of a display pixel. As shown in (A), a beam data array 106 before the interpolation process includes a plurality of sets of beam data 107, each of which has a plurality of real pixels 108. As the depth becomes deeper, the line spacing is widened. If a simple linear interpolation process is applied and a plurality of interpolation pixels are embedded, the problem of significant degradation of the image quality tends to occur. On the other hand, as shown in (B), a beam data array 110 forming the high-density frame includes a plurality of interpolation lines 106 in addition to the plurality of original beam data (beam lines) 107. More specifically, an interpolation line is inserted between adjacent beam lines. Because of this, the density of the pixels referred to in the scan conversion process can be increased, in particular, in a deep portion in the living body, and the image quality after the scan conversion process can be improved particularly in the deep portion. In other words, the problem of shifting of the image in the beam scan direction or blurring of the image by the scan conversion process can be prevented or reduced.

Figure 14:
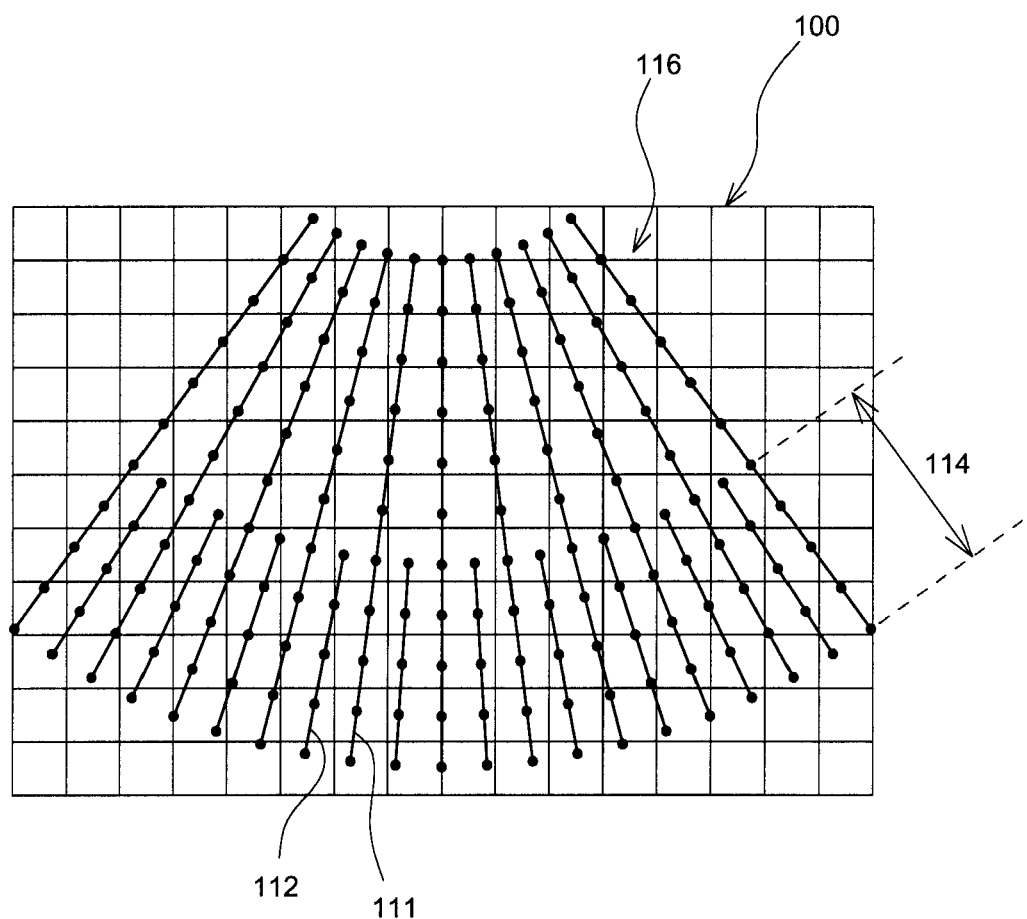
FIG. 14 is a conceptual diagram illustrating a partial beam interpolation process.

FIG. 14 shows a result of application of the line interpolation process on a portion (a deep portion) in a depth direction. In other words, the line interpolation process is applied to a partial range 114 in the depth direction. Reference numeral 111 represents a beam line, and reference numeral 112 represents an interpolation line. The interpolation line is generated only in the partial range 114, and, with this configuration, data are effectively added only in the region where interpolation is necessary. From a different point of view, data may be reduced for portions where the interpolation process is not as necessary. With this process, an effective scan conversion process can be executed.

Figure 15:
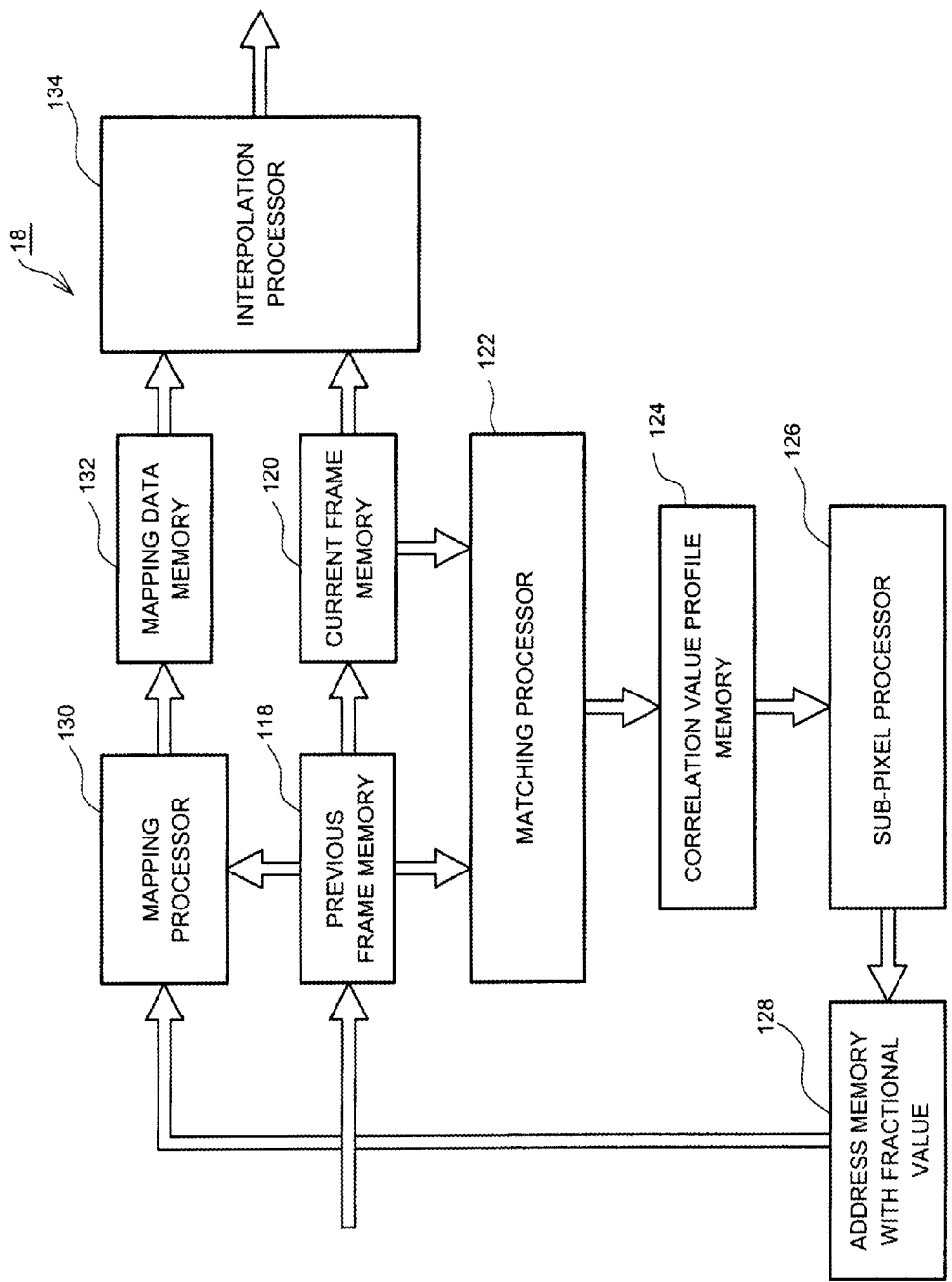
FIG. 15 is a block diagram showing a first example structure of the density increasing unit shown in FIG. 1.

FIG. 15 shows a first example structure of the density increasing unit shown in FIG. 1. The previous frame (previous frame data) is stored in a previous frame memory 118. The current frame (current frame data) is stored in a current frame memory 120. Alternatively, the matching process may be applied not between adjacent frames, but between frames distanced from each other by one or a plurality of frames.

A matching processor 122 applies the pattern matching process between frames as described above. With this process, the two-dimensional correlation value profile for each pixel of the previous frame is acquired, and is stored in a correlation value profile memory 124. The sub-pixel process is applied by a sub-pixel processor 126 on the two-dimensional correlation value profile for each pixel of interest. With this process, an address on the current frame (mapping address with fractional value) corresponding to the pixel of the previous frame is determined for each pixel of the previous frame. This data are stored in a memory 128.

A mapping processor 130 identifies, for each pixel of the previous frame, an address to which the pixel is to be mapped, by referring to the address with fractional value stored in the memory 128, and writes the pixel value of the pixel on the corresponding address on a memory 132. That is, the pixels of the previous frame are mapped with a new arrangement in a two-dimensional memory space of the mapping data memory 132. An interpolation processor 134 applies the line interpolation process described above based on the current frame stored in the current frame memory 120 and the mapping data stored in the mapping data memory 132. With this process, the high-density frame is generated. In other words, the current frame is re-constructed into the high-density frame.

Figure 16:
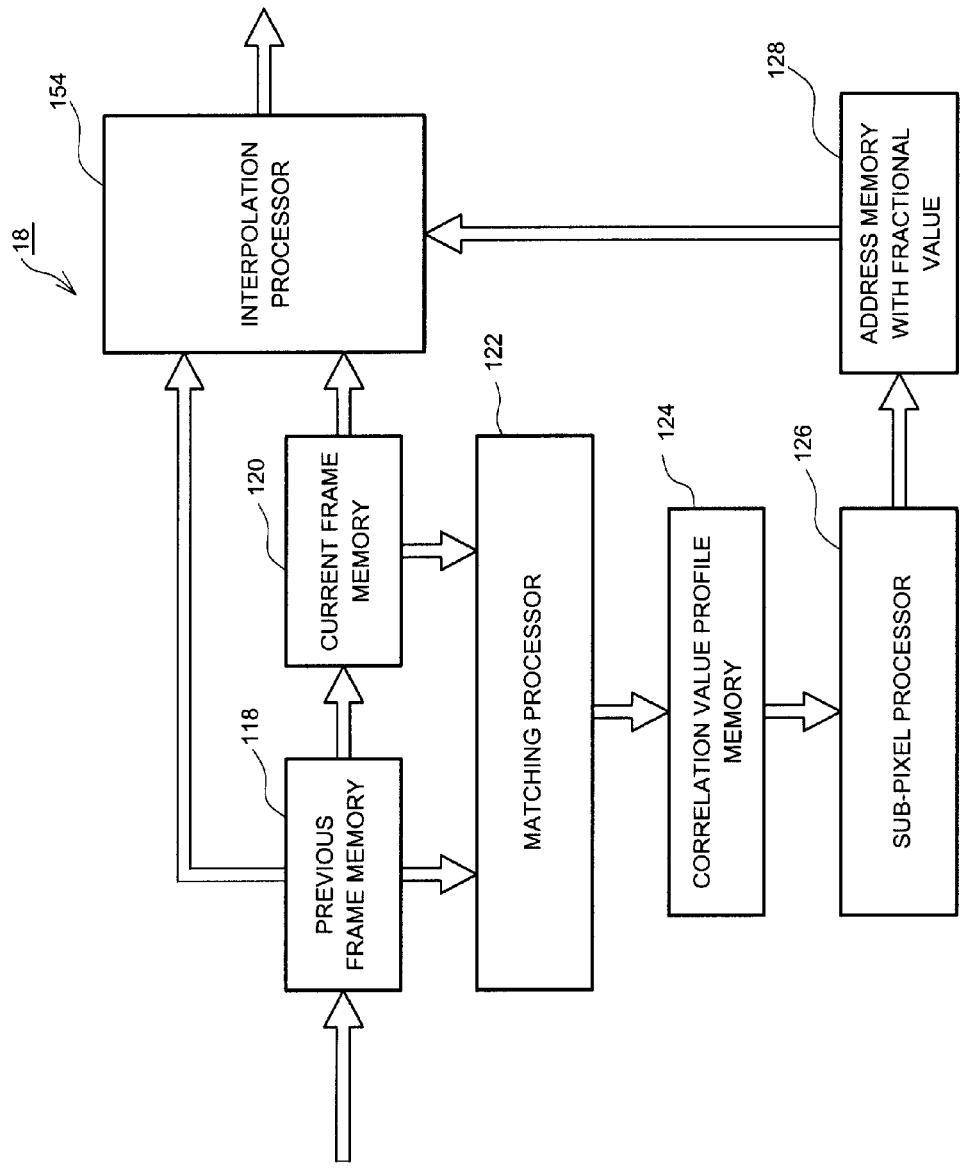
FIG. 16 is a block diagram showing a second example structure of the density increasing unit shown in FIG. 1.

In a second example structure of the density increasing unit shown in FIG. 16, the mapping of pixels of the previous frame is not actually executed, the pixel value and the address with fractional value are referred to for each pixel of the previous frame, and the line interpolation process is applied on the current frame by an interpolation processor 154 based on the pixel value and the address with fractional value. The same reference numerals are assigned to common elements shown in FIG. 15, and description of these elements will not be repeated. This applies similarly to the below-described drawings.

Figure 17:
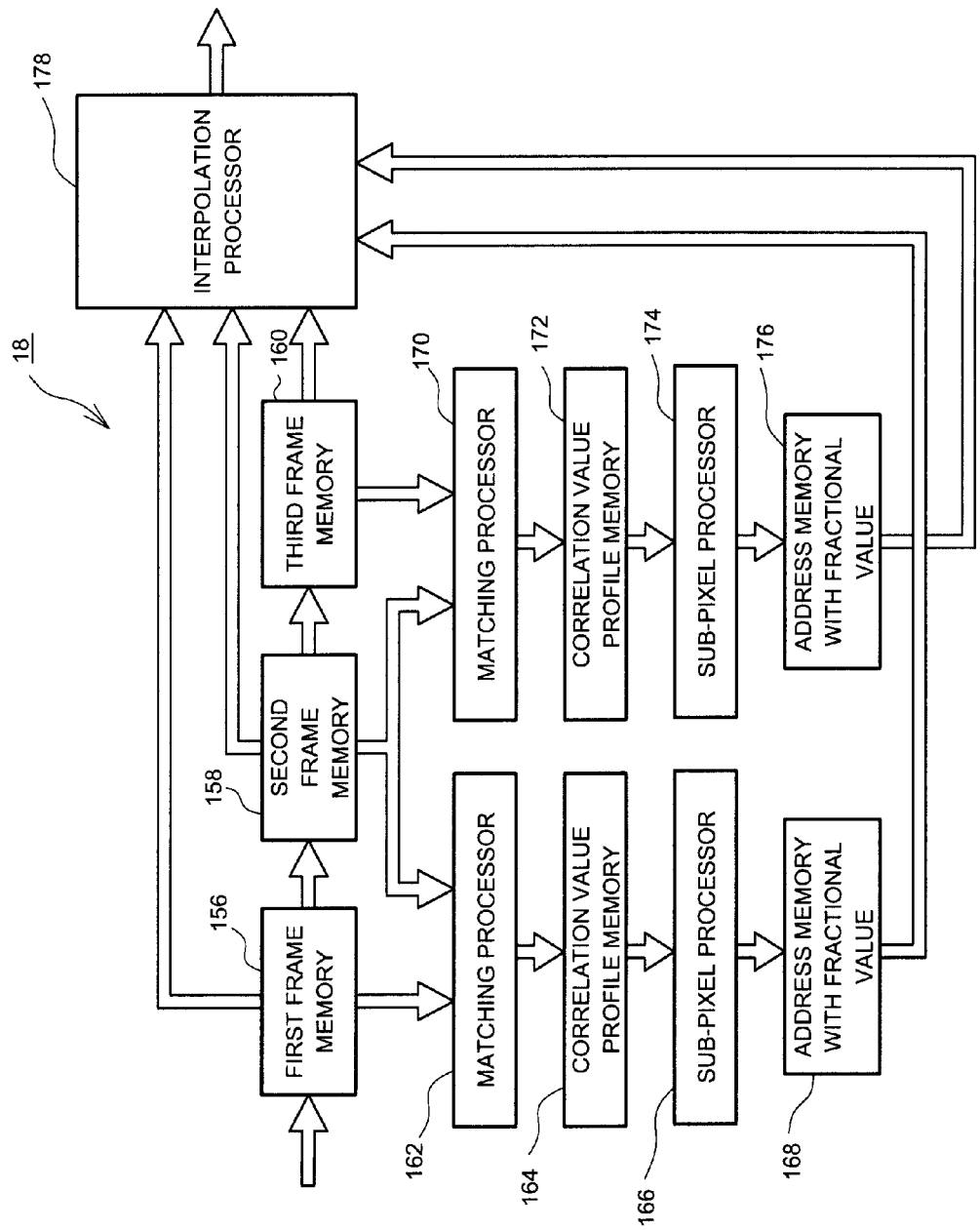
FIG. 17 is a block diagram showing a third example structure of the density increasing unit shown in FIG. 1.

In a third example structure of the density increasing unit shown in FIG. 17, a first frame memory 156, a second frame memory 158, and a third frame memory 160 are connected in series. The first frame memory 156 stores the previous frame, the second frame memory 158 stores an intermediate frame, and the third frame memory 160 stores a subsequent frame. A matching processor 162 applies the matching process between the previous frame and the intermediate frame, and, with this process, a two-dimensional correlation value profile for each pixel of interest is stored in a correlation value profile memory 169. A sub-pixel processor 166 applies the sub-pixel process for each pixel of interest, and an address with fractional value for each pixel of interest thus acquired is stored in a memory 168.

In a similar manner, a matching processor 170 applies the matching process between the subsequent frame and the intermediate frame for each pixel of interest, and a two-dimensional correlation value profile for each pixel of interest thus acquired is stored in a memory 172. A sub-pixel processor 179 applies the sub-pixel process for each pixel of interest, and an address with fractional value for each pixel of interest thus generated is stored in a memory 176. An interpolation processor 178 applies the line interpolation process on the intermediate frame using the mapping result of the previous frame and the mapping result of the subsequent frame. With this process, a frame in which the density is increased can be re-constructed.

Figure 18:
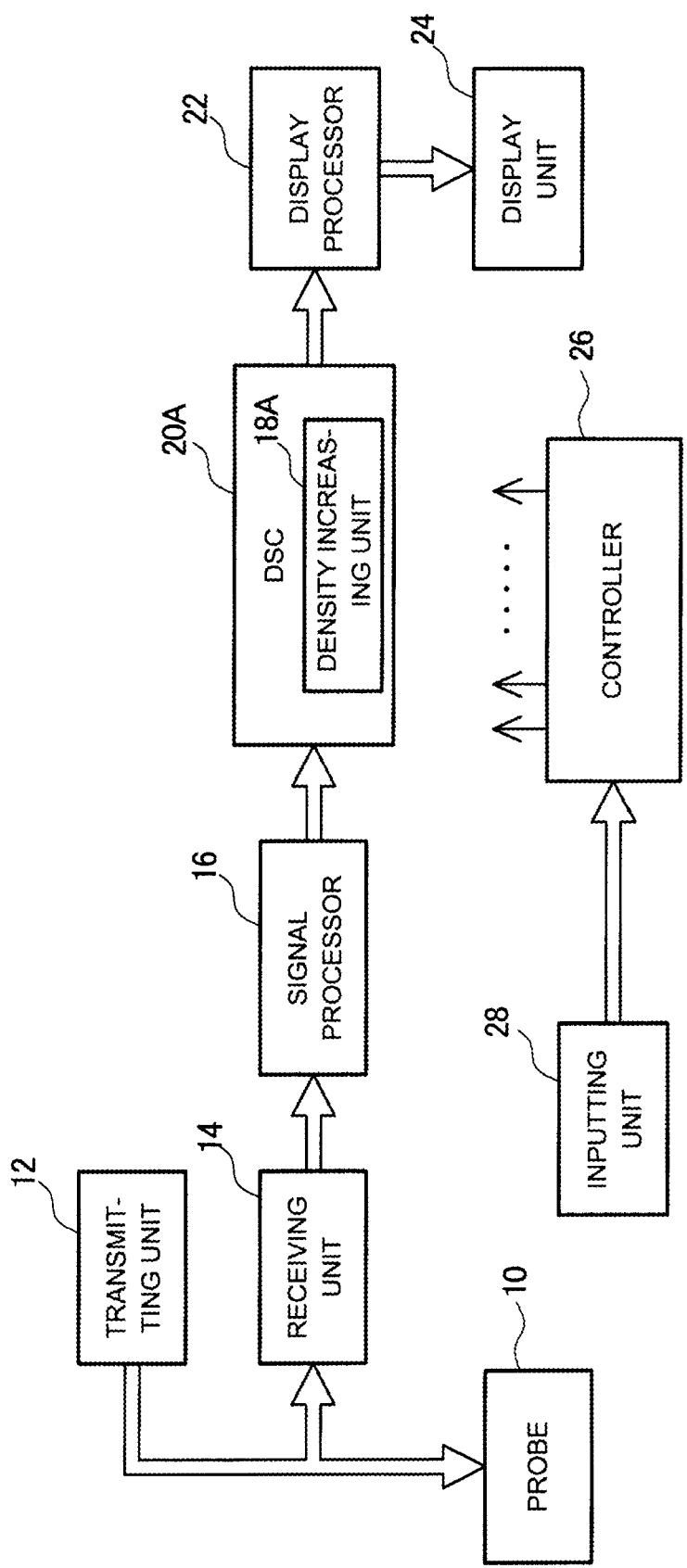
FIG. 18 is a block diagram showing a first alternative configuration of the basic structure shown in FIG. 1.

FIG. 18 shows a first alternative configuration of the ultrasound diagnosis apparatus. In the first alternative configuration of FIG. 18, a DSC 20A comprises a density increasing unit 18A. In other words, the density increasing process and the scan conversion process are applied at the same time. More specifically, the pattern matching process and the sub-pixel process are applied for each pixel of the previous frame, and the scan conversion process is applied based on the result of the process without independently applying the line interpolation process on the result of the process. With such a configuration, the line interpolation process may be omitted. However, in the scan conversion process, a complicated address calculation would be required. In this first alternative configuration also, similar to the basic structure described above, the scan conversion process is executed after the density increasing process.

Figure 19:
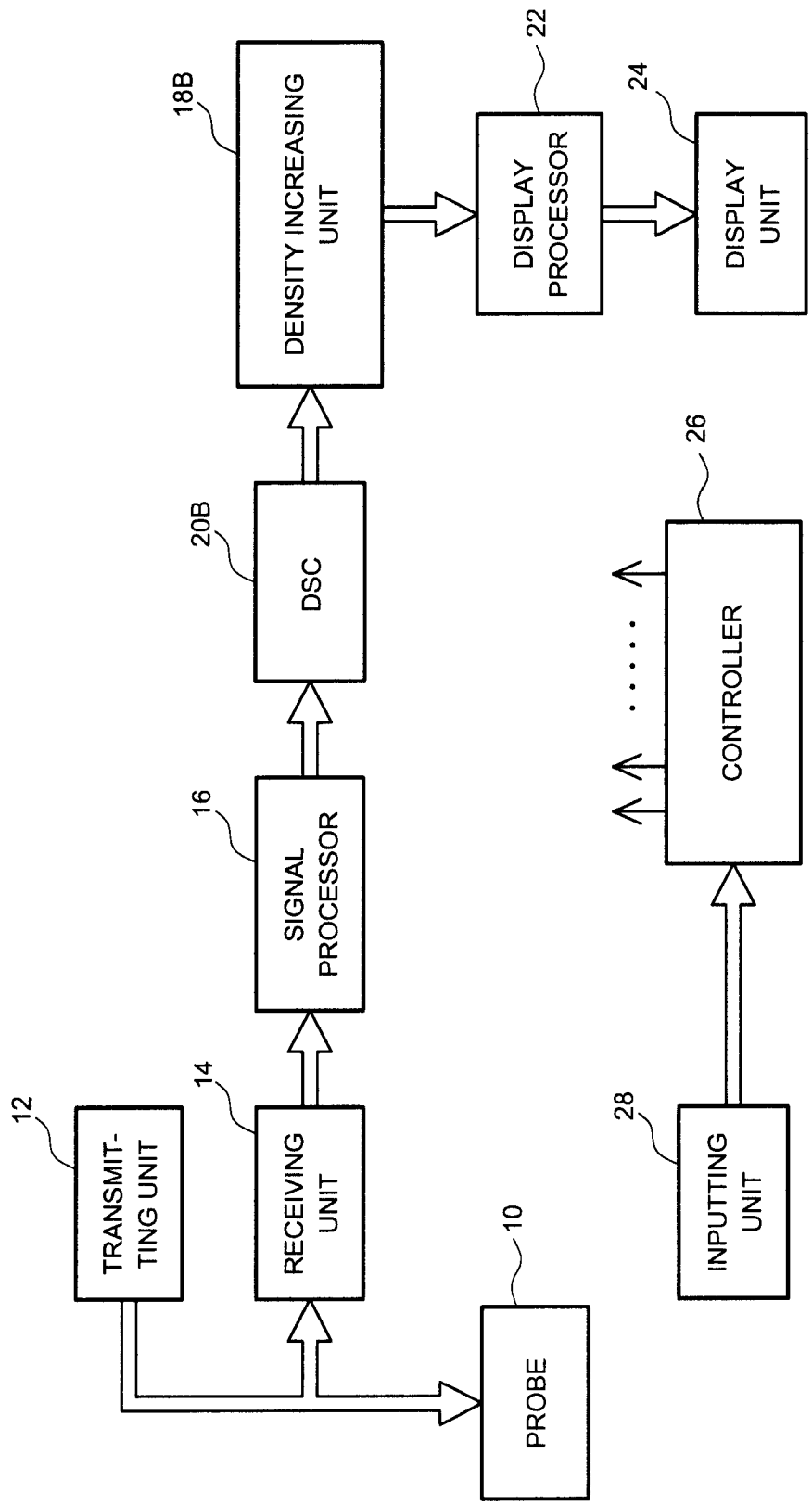
FIG. 19 is a block diagram showing a second alternative configuration of the basic structure shown in FIG. 1.

FIG. 19 shows a second alternative configuration of the ultrasound diagnosis apparatus. In FIG. 19, a density increasing unit 18B is provided downstream of a DSC 20B. Specifically, the density increasing unit 18B applies a process for increasing the density on a display frame, and not on the received frame. In other words, the pattern matching process and the sub-pixel process as described above are applied between display frames, and the line interpolation process is applied based on the result of these processes. Then, in the density increasing unit 18B or in the display processor 22, a thinning process for conforming with the pixel density of the display screen is applied on the high-density display frame as necessary. The structure of FIG. 19 is preferably employed in cases such as when recording of a high resolution frame is desired.

(2) Density Increasing Using Pattern Matching Process in Frame

Figure 20:
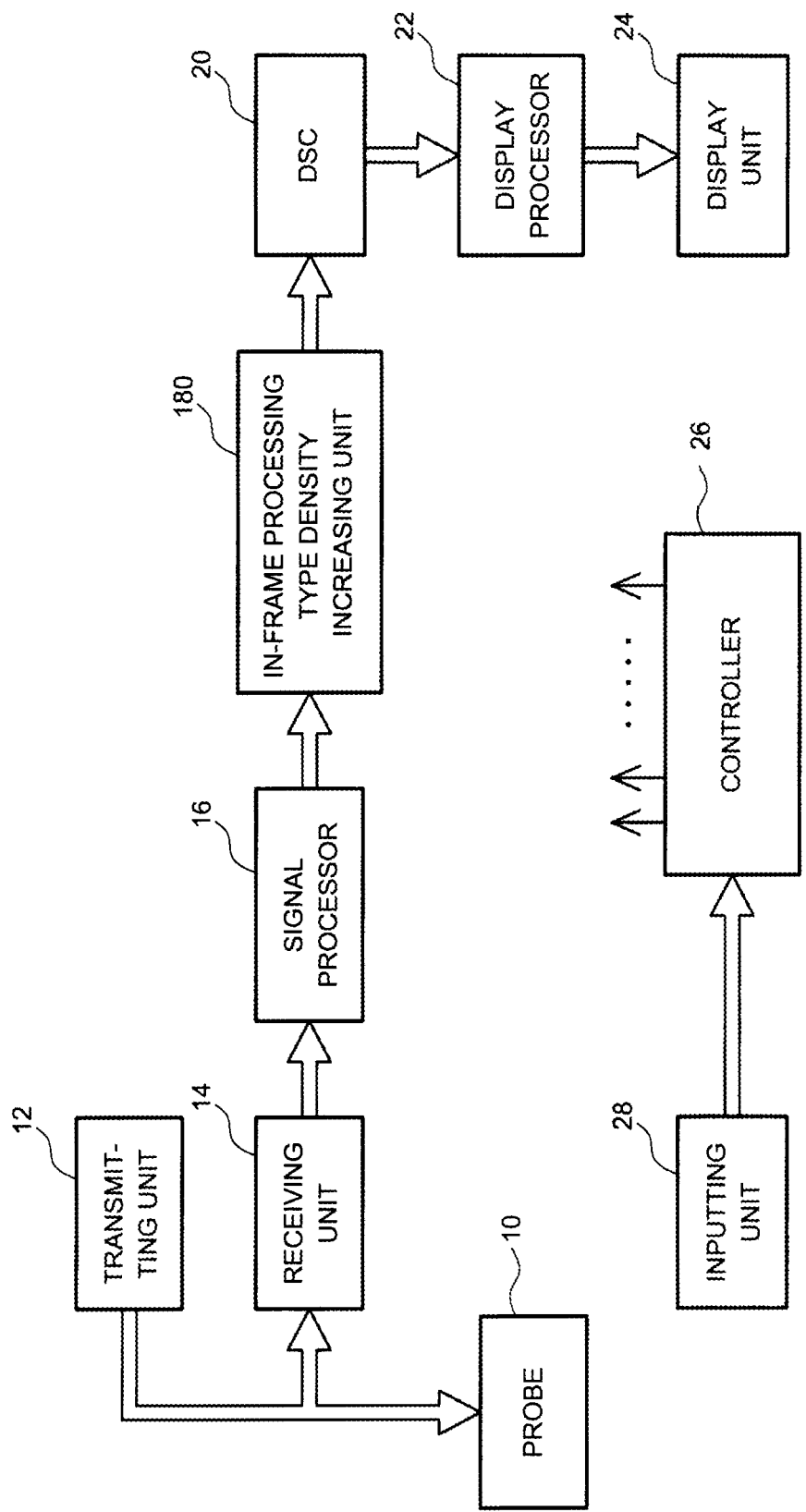
FIG. 20 is a block diagram showing a basic structure of an ultrasonic image processing apparatus (ultrasound diagnosis apparatus) having another density increasing function.

FIG. 20 is a block diagram showing another basic structure of an ultrasound diagnosis apparatus. The same reference numerals are assigned to common elements as in FIG. 1, and descriptions of these elements will not be repeated.

In the example configuration of FIG. 20, a density increasing unit 180 of an in-frame processing type is provided downstream of the signal processor 16. That is, while in the example structure of FIG. 1, the density increasing unit of an inter-frame processing type is provided, in the example structure of FIG. 20, there is provided a unit which applies the density increasing not between frames but within a frame. An operation of this structure will be described with reference to FIGS. 21 and 22.

Figure 21:
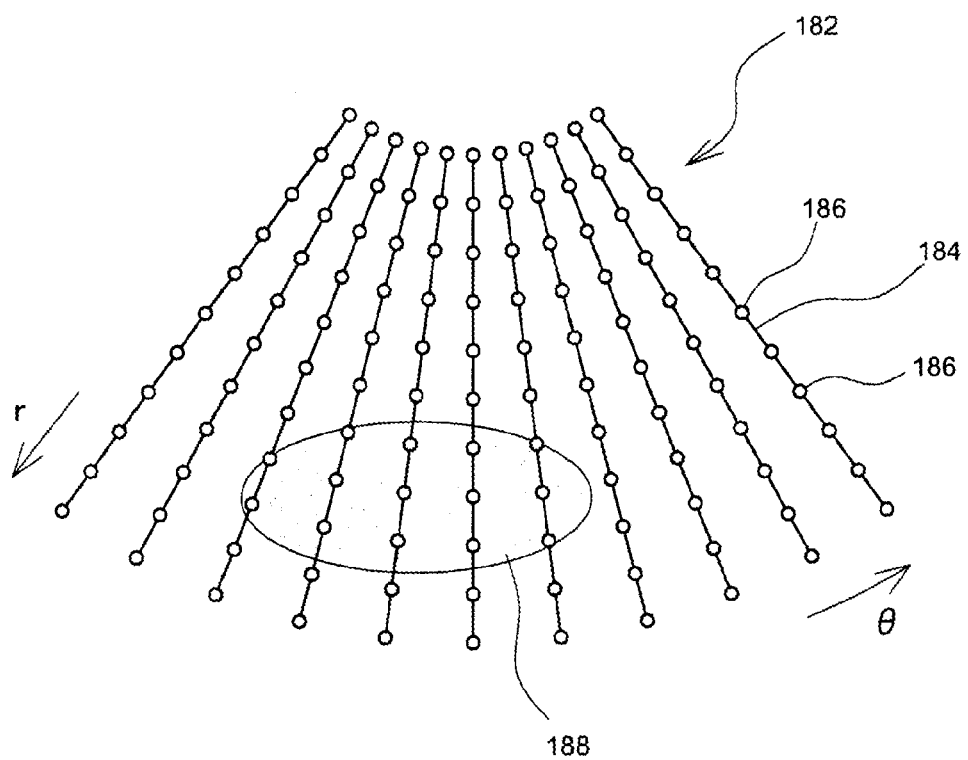
FIG. 21 is a diagram showing a beam data array.

FIG. 21 shows a beam data array 182 in the real space. The beam data array 182 comprises a plurality of sets of beam data 184, with each set of beam data 184 having a plurality of data points; that is, a plurality of pixles 186. Reference numeral 188 represents a tissue present in the living body. As shown in FIG. 21, in a deep region in the beam data array 182, the beam spacing is widened, and the density of the real pixel is reduced.

Figure 22:
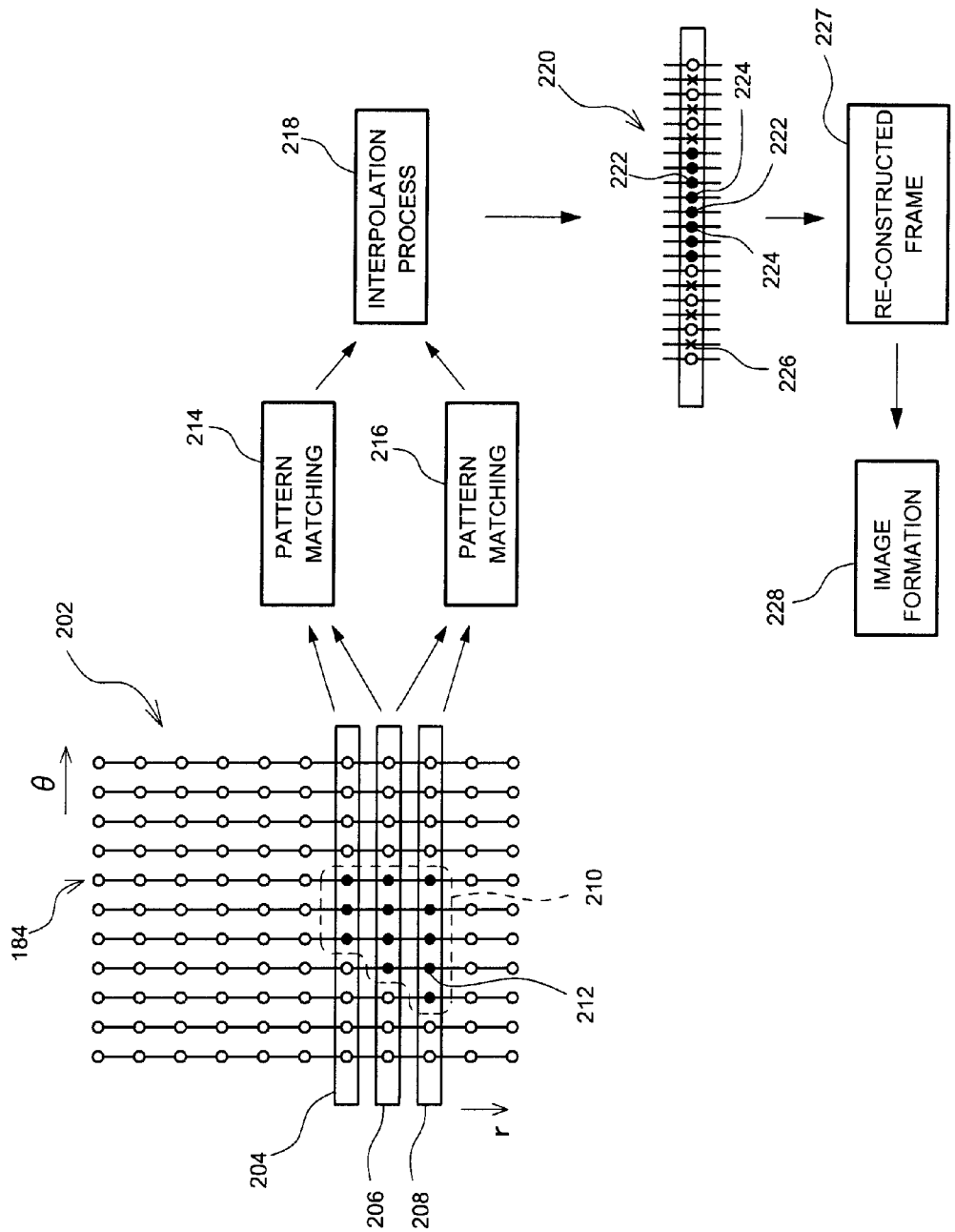
FIG. 22 is a conceptual diagram for explaining an operation of a density increasing unit of an in-frame processing type in relation to the ultrasonic image process apparatus shown in FIG. 20.

FIG. 22 shows the in-frame density increasing process as a conceptual diagram. Reference numeral 202 represents a beam data array; that is, a beam line array. More specifically, a plurality of sets of beam data 189 are aligned in the θ direction. The white circles and black circles represent pixels, and, in particular, the black circles represent pixels 212 in the tissue. Reference numeral 210 represents a group of pixels 212 in the tissue. In the present embodiment, two reference pixel arrays are defined previously and subsequently from the pixel array to be processed. More specifically, a first pixel array 209, a second pixel array 206, and a third pixel array 208 are defined. Here, the second pixel array 206 is the target pixel array (array of pixels of interest), the first pixel array 204 is the previous pixel array (first reference pixel array), and the third pixel array 208 is the subsequent pixel array (second reference pixel array). The pixel array of each depth is selected, in order, as the target pixel array. In a pattern matching process 214, a one-dimensional pattern matching process is applied between the first pixel array 204 and the second pixel array 206 for a pixel of interest in the first pixel array 204, so that a mapping position (copy position) of the pixel of interest of the pixel of interest on the second pixel array 206 is determined. Similarly, in a pattern matching process 216, a one-dimensional pattern matching process is applied between the third pixel array 208 and the second pixel array 206 for a pixel of interest in the third pixel array 208, so that a mapping position (copy position) of the pixel of interest on the third pixel array 208 is determined. Then, an interpolation process 218 is applied based on a plurality of original, real pixels of the second pixel array 206 and a plurality of copy pixels (real pixels on other lines) which are imaginarily or actually mapped on the second pixel array, so that a high-density pixel array 220 is constructed. The high-density pixel array 220 comprises a plurality of original real pixels 222 of the second pixel array 206, and a plurality of interpolation pixels 224 and 226 which are added later to the second pixel array 206. The interpolation pixel 224 is a pixel in the tissue and the interpolation pixel 226 is a pixel outside of the tissue. The plurality of interpolation pixels 224 and 226 are set between two adjacent real pixels 222, and the arrangement of the pixels in the beam scan direction is at equal spacing. When such a process is applied for each pixel array of each depth, the density of the frame can be increased using the pixels of the frame itself; that is, a re-constructed frame 227 in which the density is increased can be constructed. Then, as shown by reference numeral 228, the scan conversion process is applied to the re-constructed frame 227, and the display frame is thus generated.

In FIG. 22, each of the pixel arrays 204, 206, and 208 has a thickness of one pixel in the depth direction. Alternatively, the pixel array may have a thickness corresponding to a plurality of pixels. However, in the pattern matching processes 214 and 216, a one-dimensional pattern matching process in the beam scan direction is desirably applied. The in-frame density increasing process will now be described in more detail with reference to FIG. 23 and subsequent drawings.

Figure 23:
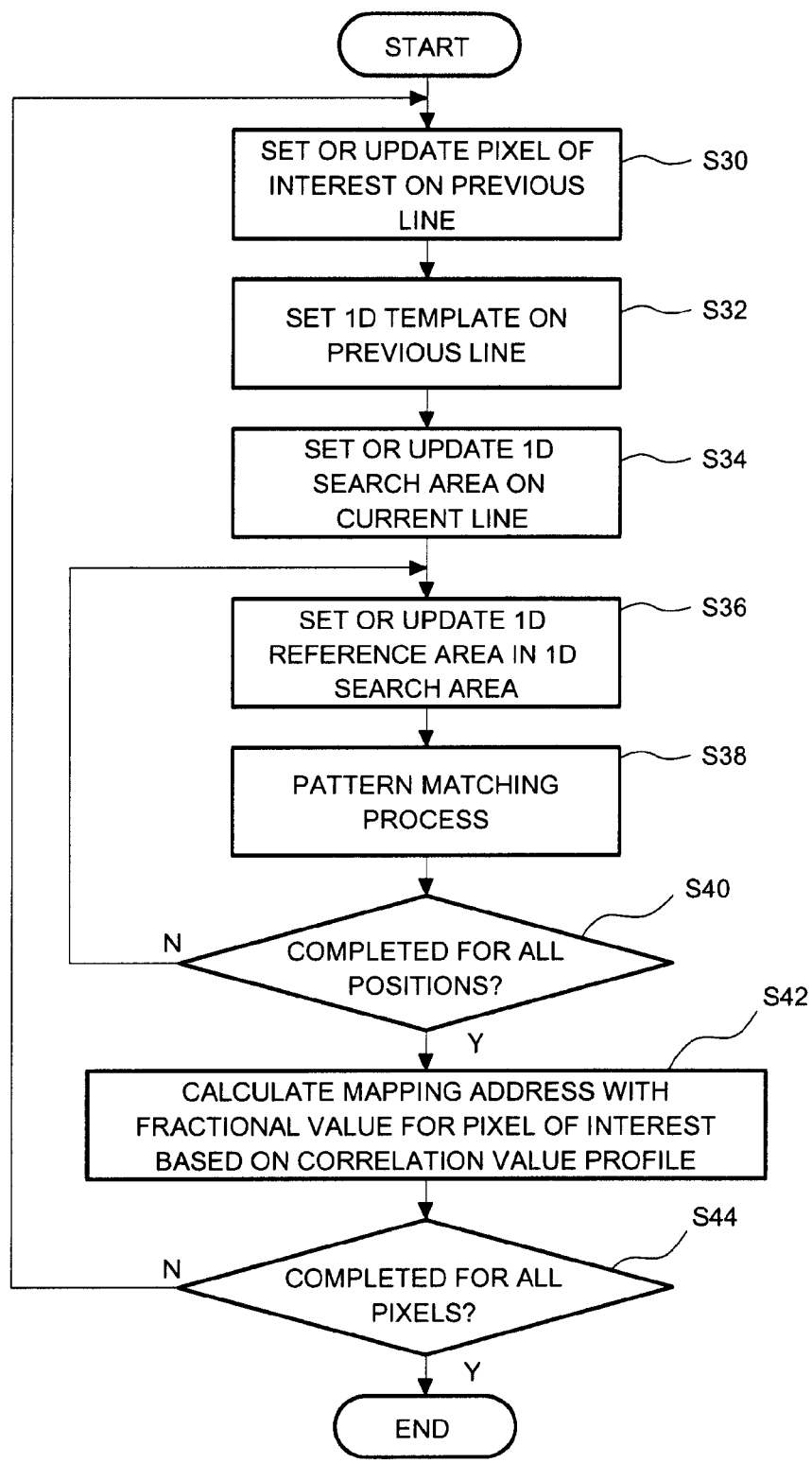
FIG. 23 is a flowchart showing a sequence of steps of a pattern matching process in a frame.
Figure 24:
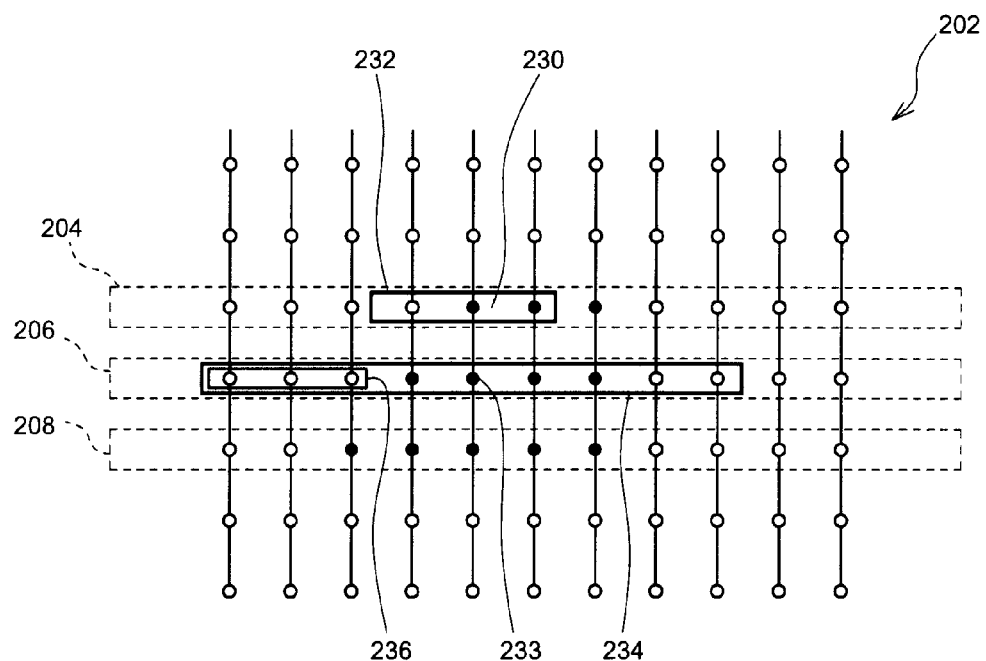
FIG. 24 is a conceptual diagram illustrating a pattern matching process in a frame.

FIG. 23 shows a flowchart of a specific process of the pattern matching processes 214 and 216 shown in FIG. 22. In S30, a pixel of interest is set on a previous line, and, in S32, a one-dimensional template is set on the previous line. In S34, a one-dimensional search area is set on the current line, and, in S36, a one-dimensional reference area is set in the one-dimensional search area. These processes will be described with reference to FIG. 24. In FIG. 24, a plurality of pixel arrays 204, 206, and 208 extending in a direction perpendicular to (intersecting) the beam are defined in the beam data array 202, and each pixel array comprises a plurality of pixels existing at the same depth. In other words, the individual pixel arrays 204, 206, and 208 include a plurality of pixels aligned in the beamscan direction. In FIG. 24, particularly, the pattern matching process between the first pixel array 204 and the second pixel array 206 is shown. The first pixel array 204 corresponds to the previous line, and each pixel in the pixel array is determined as a pixel of interest 230. A template 232 is set centered at the pixel of interest 230 and with a width in the beam scan direction. The template 232 is a one-dimensional (1D) template. On the other hand, in the second pixel array 206, a search area 234 is set centered at a point 233 corresponding to the pixel of interest 230. A reference area 236 is set in the search area 234. The reference area 236 is a one-dimensional pixel array having a size similar to that of the template 232. The one-dimensional pattern matching process is repeatedly applied between the template 232 and the reference area 236 while the position of the reference area 236 is sequentially shifted.

Figure 25:
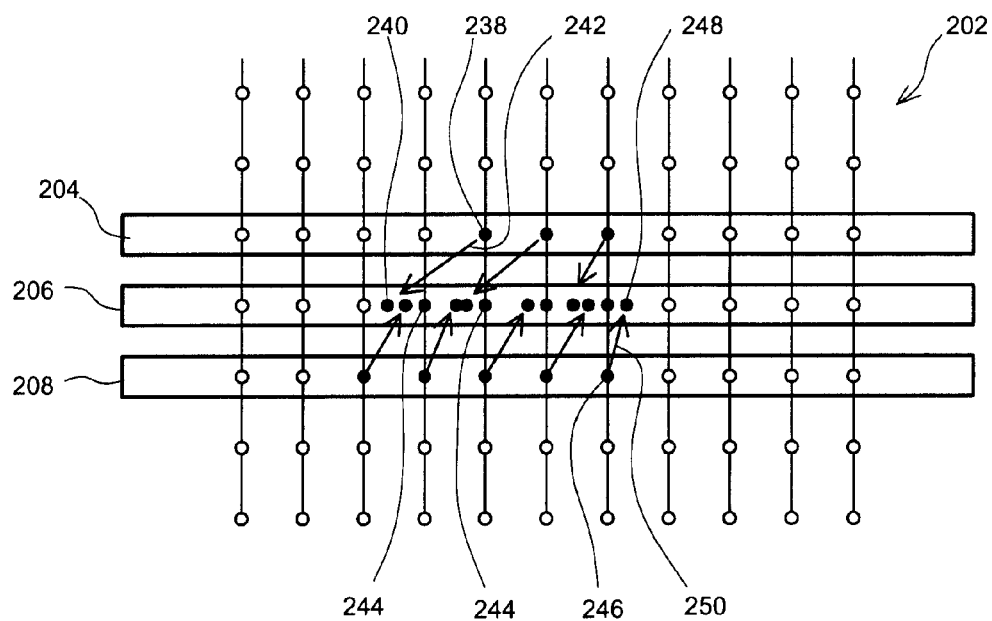
FIG. 25 is a conceptual diagram illustrating a one-dimensional mapping address (movement destination).

In FIG. 23, in S40, it is judged whether or not the pattern matching process has been applied in all positions of all reference areas in the search area, and, if the pattern matching process is not completed for all reference area positions, the processes from S36 are repeatedly applied. On the other hand, when it is judged in S40 that the pattern matching process is completed for all reference area positions, in S42, the sub-pixel process is applied. That is, a mapping address with fractional value is calculated for each pixel of interest based on a one-dimensional correlation value profile. This process will be described with reference to FIG. 25. A pixel 238 in the first pixel array 204 corresponds to a correspondent position 240 on the second pixel array 206. In other words, the pixel 238 is imaginarily mapped or actually mapped to the correspondent position 240. The correspondence relationship is shown with reference numeral 242. Similarly, for a pixel 246 in the third pixel array 208, a correspondent position 248 on the pixel array 206 is determined. The correspondence relationship is shown with reference numeral 250. By such a mapping from previous and subsequent pixel arrays in this manner, the density of the second pixel array 206 is increased. In other words, the second pixel array in which the density is increased includes a plurality of original real pixels 244 and a plurality of added pixels (real pixels on other lines) which are mapped.

In FIG. 23, in S44, it is judged whether or not the above-described process is completed for all pixels on the previous line, and, if the process is not completed, the processes from S30 are repeatedly executed. In FIG. 23, the process between the previous line and the current line is shown. However, as can be understood from the above description, a similar process is applied between the subsequent line and the current line.

Figure 26:
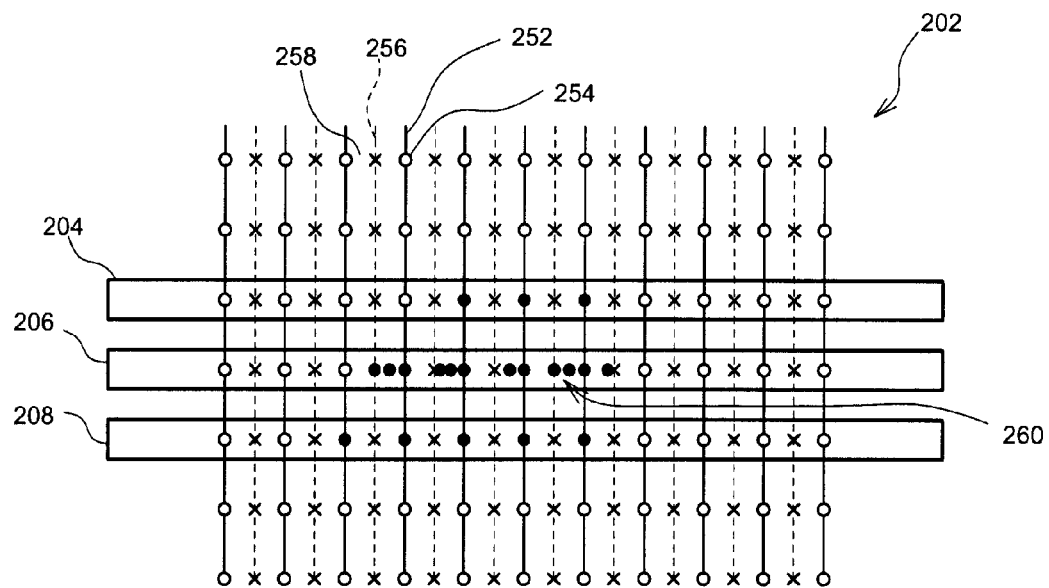
FIG. 26 is a conceptual diagram illustrating an imaginary mapping process result between lines.
Figure 27:
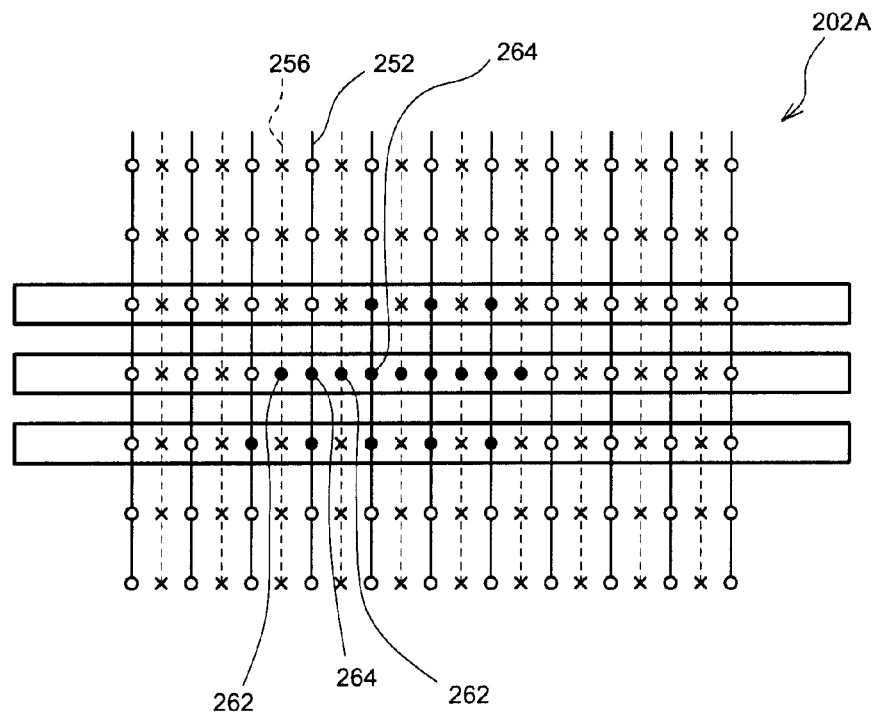
FIG. 27 is a conceptual diagram illustrating a pixel array (line) having increased density after the interpolation process.

FIG. 26 shows a relationship between a beam line 252 and an interpolation line 256. The beam line (beam data) 252 has a plurality of pixels 254. Meanwhile, the interpolation line 256 has a plurality of interpolation points (interpolation pixels) 258. In the pixel array 206 which is currently of interest, as described above, a plurality of mapped pixels exist in addition to the plurality of real pixels. As shown in FIG. 27, as a result of the application of the interpolation process, an interpolation pixel 262 is generated on the pixel array of interest and on each interpolation line. With this process, a pixel array in which the density is increased can be formed. When the above-described interpolation process is applied to each pixel array of each depth, a data array 202A having a high density as an overall frame can be acquired. Thus, the scan conversion process may be executed based on the data array 202A, so that a display frame of high density and high quality can be formed.

Figure 28:
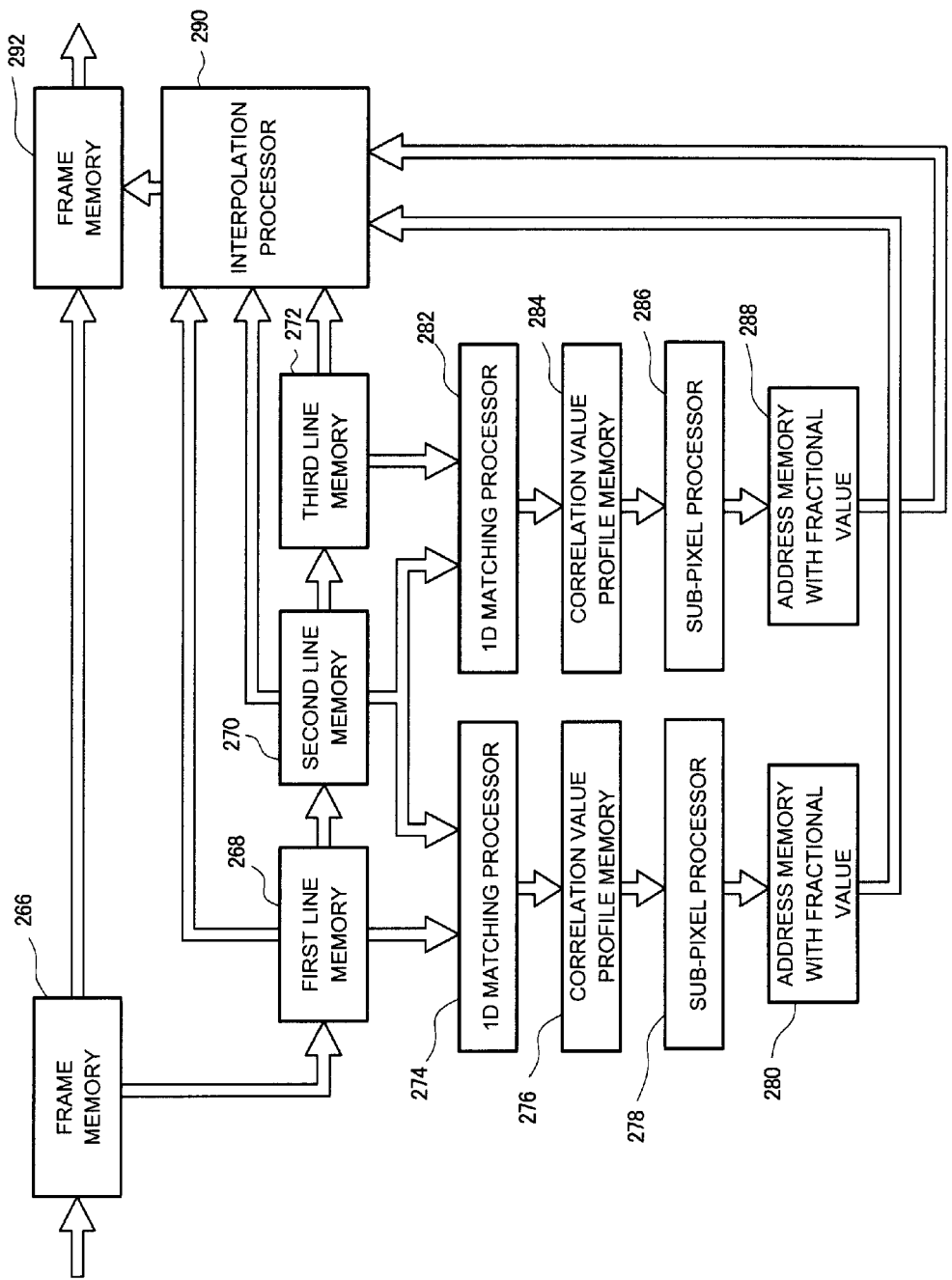
FIG. 28 is a block diagram showing an example configuration of the density increasing unit shown in FIG. 20.

FIG. 28 shows an example structure of a density increasing unit 180 of an in-frame processing type shown in FIG. 20. A frame (frame data) before the process is stored in a frame memory 266, and a frame (frame data) after the process is stored in a, frame memory 292. A first line memory 268, a second line memory 270, and a third line memory 272 are connected in series. A pixel array of the previous line is stored in the first line memory 268, a pixel array of the current line is stored in the second line memory 270, and a pixel array of the subsequent line is stored in the third line memory 272. The one-dimensional matching process and the sub-pixel process are applied between adjacent lines. More specifically, in each of 1D matching processors 274 and 282, a matching process for each pixel of interest is applied between two lines, and a one-dimensional correlation value profile for each pixel acquired as a result of this process is stored in each of respective memories 276 and 284. Sub-pixel processors 278 and 286 apply the sub-pixel process for each pixel of interest based on the one-dimensional correlation value profile, to determine an address with fractional value for each pixel of interest, and the address with fractional value is stored in memories 280 and 288.

An interpolation processor 290 applies an interpolation process based on the plurality of real pixels of the target pixel array; that is, the current line, and the plurality of mapping pixels mapped from the previous and subsequent lines, to re-construct a pixel array in which the density is increased, as a result of the interpolation process. The re-constructed pixel array is stored in the frame memory 292. When the re-constructing process as described above is applied to each pixel array of each depth, a frame in which the density is increased is formed on the frame memory 292.

Figure 29:
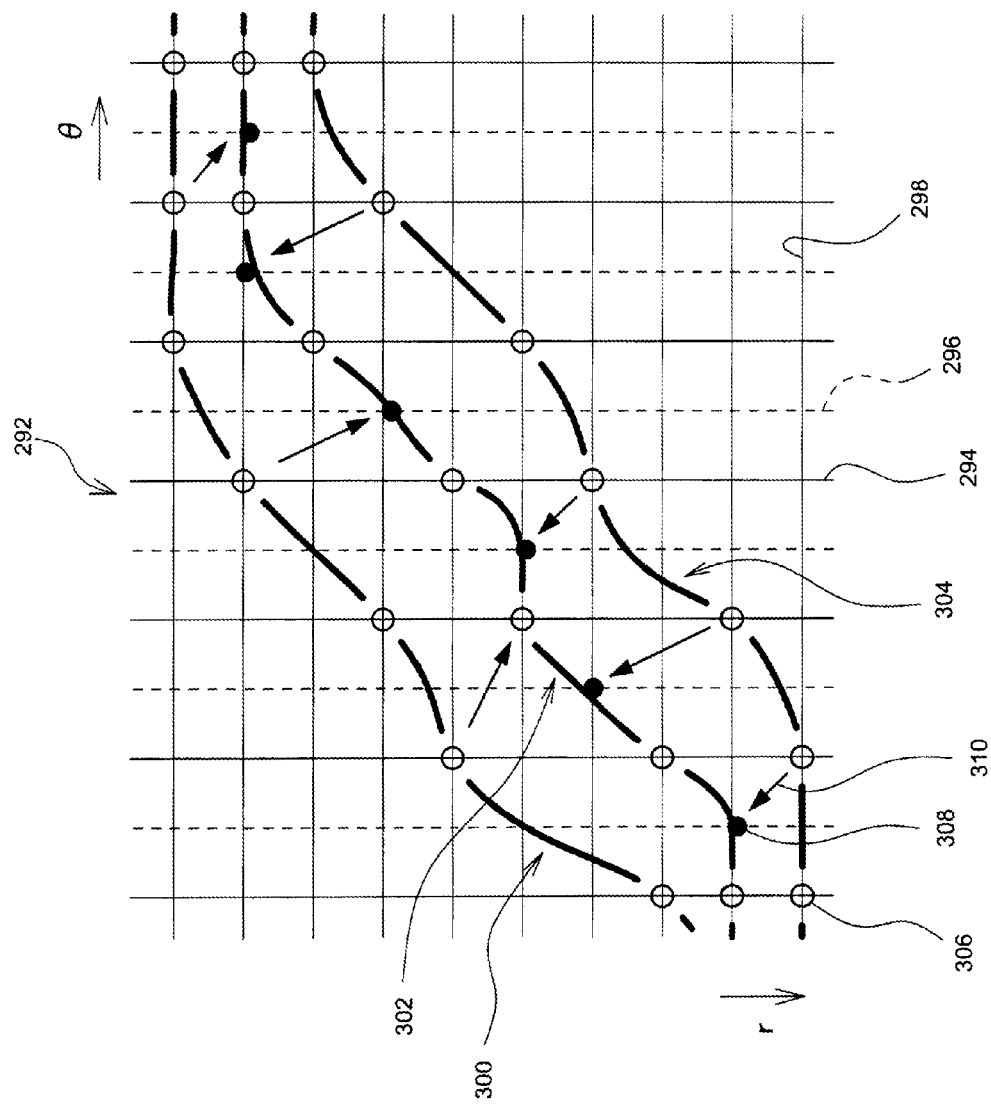
FIG. 29 is a conceptual diagram for explaining boundary emphasis achieved by the density increase.

FIG. 29 shows an effect of the interpolation process as described above. Specifically, FIG. 29 shows an outline emphasizing effect. Reference numeral 294 represents a beam line, reference numeral 296 represents an interpolation line, and reference numeral 298 represents a horizontal line; that is, a line for each depth. Reference numeral 300 represents an outline at a first time phase, reference numeral 302 represents an outline at a second time phase, and reference numeral 304 represents an outline at a third time phase. In other words, with the movement of the tissue, the outline is gradually moved in a direction toward the bottom right. White circles represent real pixels and black circles represent interpolation pixels. An arrow shown by reference numeral 310 represents mapping (copying) of the pixel. According to the process shown in the present embodiment, as shown on the outline 302, the number of pixels in the outline can be increased, and, thus, there can be obtained an advantage that the density of the outline is increased and the outline can be displayed in an emphasized manner.

(3) Combined Method and Other Methods

Figure 30:
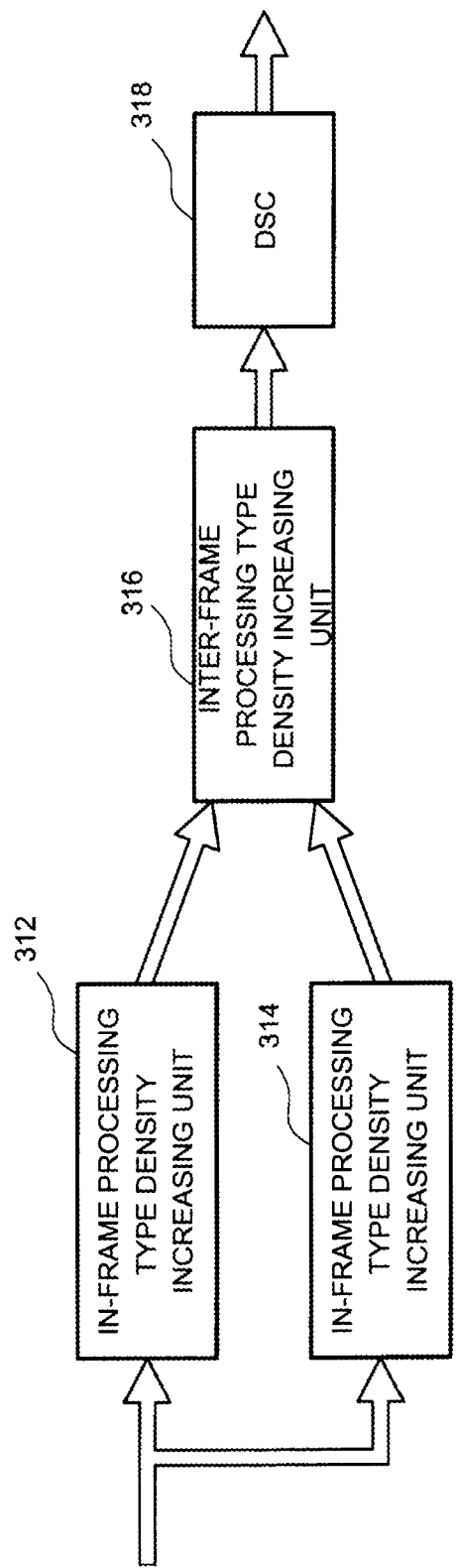
FIG. 30 is a block diagram showing an example combination of two types of density increasing processes.

FIG. 30 shows an example combination of the in-frame process and the inter-frame process. In FIG. 30, first in-frame processing type density increasing units 312 and 314 are provided in parallel to each other, and the in-frame process is applied to two frames. Then, in an inter-frame processing type density increasing unit 316, the inter-frame process is applied based on the two frames in which the density is increased. As a result, a frame in which the density is significantly increased is constructed, and is output to a DSC 318.

Figure 31:
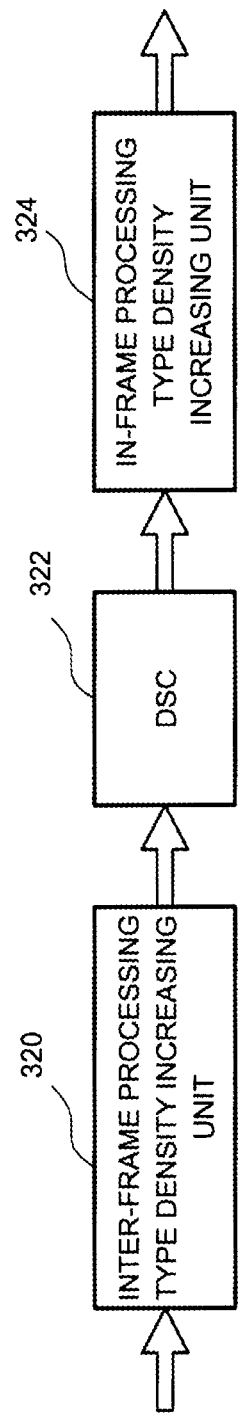
FIG. 31 is a block diagram showing another example configuration of two types of density increasing processes.

In another example combination shown in FIG. 31, a DSC 322 is provided downstream of an inter-frame processing type density increasing unit 320, and an in-frame processing type density increasing unit 324 is provided downstream of the DSC 322. In this manner, various combinations of the in-frame process and the inter-frame process can be considered. Alternatively, the processing content of the density increasing process may be switched according to an operation mode or a measurement condition.

In the above-described embodiment, the inter-frame process is based on the idea that the movement of the tissue is very small between frames which are close to each other in time, and that, therefore, the density of the subsequent frame can be increased by mapping the pixel of the previous frame to the subsequent frame. On the other hand, the in-frame process assumes that a certain similarity relationship exists between a pixel array of a certain depth and a pixel array in front of or in back of the pixel array because of the continuity of the tissue in the depth direction, and the image quality is improved by increasing the density of the pixel value. Alternatively, the above-described processes may be applied to volume data. In addition, in the above-described in-frame process, the process for the pixel of interest is applied to all pixels in the pixel array direction, but alternatively, the process for the pixel of interest may be applied only to the pixels belonging to, for example, a certain portion of a center portion.

What is claimed is:

1. An ultrasonic image processing apparatus comprising:
a controller configured to include an in-frame processor and a re-constructing unit;
the in-frame processor which applies a process between a first pixel array and a second pixel array in a frame acquired by transmitting and receiving ultrasound, and which calculates a movement destination on the second pixel array for each pixel of interest in the first pixel array; and
the re-constructing unit which re-constructs the second pixel array into a high-density pixel array using the movement destination calculated for each of the pixel of interest, wherein
the in-frame processor calculates the movement destination of the pixel of interest by applying a pattern matching process between the first pixel array and the second pixel array,
wherein in the pattern matching process, the in-frame processor;
sets a template centered at the pixel of interest in the first pixel array;
sequentially sets, at different positions in the second pixel array, reference areas each having a size equal to that of the template;
generates a correlation value profile by calculating a correlation value between the template and the reference area set at each of the positions; and
calculates a correspondent address on the second pixel array as the movement destination in accordance with the correlation value profile.

2. The ultrasonic image processing apparatus according to claim 1, wherein
each of the first pixel array and the second pixel array includes a plurality of pixels arranged in a beam scan direction;
a depth of the first pixel array and a depth of the second pixel array differ from each other; and
the high-density pixel array includes a larger number of pixels than a number of formations of received beams in the beam scan direction.

3. The ultrasonic image processing apparatus according to claim 1, wherein
the in-frame processor comprises:
a correlation value profile generating unit which generates a correlation value profile as a result of the pattern matching process for each pixel of interest in the first pixel array; and
a correspondent address calculating unit which calculates a correspondent address on the second pixel array as the movement destination based on the correlation value profile for each pixel of interest in the first pixel array.

4. The ultrasonic image processing apparatus according to claim 3, wherein
the correspondent address is a correspondent address with a fractional value, including an integer part corresponding to an integer multiple of an original pixel spacing in the second pixel array and a fractional value smaller than the original pixel spacing.

5. The ultrasonic image processing apparatus according to claim 4, wherein
the re-constructing unit re-constructs the high-density pixel array by an interpolation process based on an original group of pixels of the second pixel array and an additional group of pixels defined by a pixel value and the correspondent address with fractional value for each pixel of interest.

6. The ultrasonic image processing apparatus according to claim 1, wherein
a high-density frame is formed by re-constructing a plurality of pixel arrays of the frame into a plurality of high-density pixel arrays, and
the high-density frame includes a plurality of sets of original beam data and a plurality of sets of interpolation beam data.

7. The ultrasonic image processing apparatus according to claim 1, wherein
the pixel of interest is selected in a partial region in the first pixel array and the second array, and
the high-density pixel array is a pixel array in a part of which the density is increased.

8. The ultrasonic image processing apparatus according to claim 1, wherein
the in-frame processor calculates, by a process between the second pixel array and a third pixel array in the frame acquired by transmitting and receiving ultrasound, a movement destination on the second pixel array for each pixel of interest in the third pixel array, and
the re-constructing unit re-constructs the second pixel array into the high-density pixel array using the movement destination calculated for each pixel of interest in the first pixel array and the movement destination calculated for each pixel of interest in the third pixel array.

9. The ultrasonic image processing apparatus according to claim 7, wherein
the frame comprises an ultrasonic beam array which is spread radially, and
the high-density frame includes a plurality of interpolation lines which are added at least in a deep portion of the frame.

10. The ultrasonic image processing apparatus according to claim 1, wherein
the frame is a frame which conforms with a transmission/reception coordinate system,
a high-density frame is formed by repeatedly applying the re-construction of the high-density pixel array, and
there is provided a conversion unit which generates a display frame which conforms with a display coordinate system from the high-density frame.

11. The ultrasonic image processing apparatus according to claim 1, wherein
the frame is a frame which is acquired in real time or a frame which is read from a cine memory.

12. The ultrasonic image processing apparatus according to claim 1, further comprising:
a unit which applies a pre-process to increase density of the frame by an inter-frame interpolation process before the frame is input to the in-frame processor.

13. The ultrasonic image processing apparatus according to claim 1, further comprising:
a unit which applies a post-process to further increase the density of a high-density frame generated by repeatedly applying the re-construction of the high-density pixel array or to further increase the density of a display frame acquired based on the high-density frame.

14. An ultrasonic image processing apparatus, comprising:
a controller that includes an in-frame processor which applies a process between a first pixel array and a second pixel array in a frame which is acquired by transmitting and receiving ultrasound and which conforms with a transmission/reception coordinate system, and which calculates a movement destination on the second pixel array for each pixel of interest in the first pixel array, and
a conversion unit which applies a process to convert the frame which conforms with the transmission/reception coordinate system into a display frame which conforms with a display coordinate system, and which refers to a pixel value for each of the pixel of interest and the movement destination for each of the pixel of interest during the conversion process, wherein
the in-frame processor calculates the movement destination of the pixel of interest by applying a pattern matching process between the first pixel array and the second pixel array,
wherein in the pattern matching process, the in-frame processor
sets a template centered at the pixel of interest in the first pixel array;
sequentially sets, at different positions in the second pixel array, reference areas each having a size equal to that of the template;
generates a correlation value profile by calculating a correlation value between the template and the reference area set at each of the positions; and
calculates a correspondent address on the second pixel array as the movement destination in accordance with the correlation value profile.

15. A non-transitory computer-readable storage medium with an executable ultrasonic image processing program stored thereon which is executed by an information-processing device, comprising;
applying a process between a first pixel array and a second pixel array in a frame acquired by transmitting and receiving ultrasound, and calculating a movement destination on the second pixel array for each pixel of interest in the first pixel array, and
re-constructing the second pixel array into a high-density pixel array using the movement destination calculated for each of the pixel of interest, wherein
the in-frame processor calculates the movement destination of the pixel of interest by applying a pattern matching process between the first pixel array and the second pixel array,
wherein in the pattern matching process, the in-frame processor
sets a template centered at the pixel of interest in the first pixel array;
sequentially sets, at different positions in the second pixel array, reference areas each having a size equal to that of the template;
generates a correlation value profile by calculating a correlation value between the template and the reference area set at each of the positions; and
calculates a correspondent address on the second pixel array as the movement destination in accordance with the correlation value profile.

* * * * *